(12) United States Patent
Greiner et al.

(10) Patent No.: US 10,313,109 B2
(45) Date of Patent: *Jun. 4, 2019

(54) INSTRUCTION FOR PERFORMING A PSEUDORANDOM NUMBER SEED OPERATION

(71) Applicant: INTERNATIONAL BUSINESS MACHINES CORPORATION, Armonk, NY (US)

(72) Inventors: Dan F. Greiner, San Jose, CA (US); Bernd Nerz, Borblingen (DE); Tamas Visegrady, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,459

(22) Filed: Nov. 21, 2017

(65) Prior Publication Data

US 2018/0097619 A1 Apr. 5, 2018

Related U.S. Application Data

(63) Continuation of application No. 15/237,859, filed on Aug. 16, 2016, now Pat. No. 9,860,056, which is a
(Continued)

(51) Int. Cl.
*H04L 9/06* (2006.01)
*G06F 7/58* (2006.01)
(Continued)

(52) U.S. Cl.
CPC ............ *H04L 9/0668* (2013.01); *G06F 7/582* (2013.01); *G06F 9/3001* (2013.01);
(Continued)

(58) Field of Classification Search
CPC ........ G06F 7/58; G06F 7/582; G06F 9/30007; G06F 9/3001
See application file for complete search history.

(56) References Cited

U.S. PATENT DOCUMENTS

| 5,258,936 A | 11/1993 | Gallup et al. |
| 5,365,551 A | 11/1994 | Snodgrass et al. |

(Continued)

FOREIGN PATENT DOCUMENTS

| CN | 101019099 A | 8/2007 |
| CN | 101292464 A | 10/2008 |

(Continued)

OTHER PUBLICATIONS

International Business Machines Corporation (IBM), "z/Architecture—Principles of Operation," SA22-7832-09, Tenth Edition, Sep. 2010, pp. 1-1562.

(Continued)

*Primary Examiner* — Chuong D Ngo
(74) *Attorney, Agent, or Firm* — Steven Chiu, Esq.; Kevin P. Radigan, Esq.; Heslin Rothenberg Farley & Mesiti

(57) ABSTRACT

A machine instruction is provided that has associated therewith an opcode to identify a perform pseudorandom number operation, and an operand to be used by the machine instruction. The machine instruction is executed, and execution includes obtaining a modifier indicator. Based on the modifier indicator having a first value, performing a deterministic pseudorandom number seed operation, which includes obtaining seed material based on information stored in the second operand. A selected hash technique and the seed material are used to provide one or more seed values, and the one or more seed values are stored in a parameter block.

17 Claims, 21 Drawing Sheets

Related U.S. Application Data continuation of application No. 14/550,979, filed on Nov. 22, 2014, now Pat. No. 9,424,000, which is a continuation of application No. 13/827,360, filed on Mar. 14, 2013, now Pat. No. 9,201,629.

(51) Int. Cl.
  *G06F 3/00* (2006.01)
  *G06F 9/30* (2018.01)
  *G06F 9/38* (2018.01)
  *G06F 9/455* (2018.01)

(52) U.S. Cl.
  CPC ........ *G06F 9/30007* (2013.01); *G06F 9/3895* (2013.01); *G06F 9/455* (2013.01)

(56) References Cited

U.S. PATENT DOCUMENTS

| | | | |
|---|---|---|---|
| 5,416,783 | A | 5/1995 | Broseghini |
| 5,493,687 | A | 2/1996 | Garg |
| 5,551,013 | A | 8/1996 | Beausoleil et al. |
| 5,574,873 | A | 11/1996 | Davidian |
| 5,778,069 | A | 7/1998 | Thomlinson et al. |
| 5,790,825 | A | 8/1998 | Traut |
| 5,830,064 | A | 11/1998 | Bradish |
| 6,009,261 | A | 12/1999 | Scalzi et al. |
| 6,049,612 | A | 4/2000 | Fielder et al. |
| 6,061,703 | A | 5/2000 | Debellis |
| 6,097,815 | A | 8/2000 | Shimada |
| 6,104,810 | A | 8/2000 | DeBellis et al. |
| 6,253,223 | B1 | 6/2001 | Sprunk |
| 6,308,255 | B1 | 10/2001 | Gorishek, IV et al. |
| 6,463,582 | B1 | 10/2002 | Lethin et al. |
| 6,968,460 | B1 | 11/2005 | Gulick |
| 7,209,561 | B1 | 4/2007 | Shankar et al. |
| 7,234,645 | B2 | 6/2007 | Silverbrook et al. |
| 7,249,108 | B1 | 7/2007 | Walmsley et al. |
| 7,257,718 | B2 | 8/2007 | Lundvall et al. |
| 7,904,494 | B2 | 3/2011 | Cho |
| 8,019,802 | B2 | 9/2011 | Rose et al. |
| 8,105,224 | B2 | 1/2012 | Dropsy et al. |
| 8,189,778 | B2 | 5/2012 | Zhang |
| 8,873,750 | B2 | 10/2014 | Greiner et al. |
| 9,128,791 | B1 | 9/2015 | Boppana |
| 9,201,629 | B2 | 12/2015 | Greiner |
| 9,252,953 | B2 | 2/2016 | Greiner |
| 9,424,000 | B2 | 8/2016 | Greiner |
| 9,860,056 | B2 * | 1/2018 | Greiner ................. G06F 9/3001 |
| 10,061,585 | B2 * | 8/2018 | Greiner ............... G06F 9/30181 |
| 2002/0059119 | A1 | 5/2002 | Wiebe et al. |
| 2003/0037079 | A1 | 2/2003 | Wilber |
| 2003/0059045 | A1 | 3/2003 | Ruehle |
| 2003/0149863 | A1 | 8/2003 | Henry et al. |
| 2003/0159036 | A1 | 8/2003 | Walmsley et al. |
| 2003/0188044 | A1 | 10/2003 | Bohizic et al. |
| 2004/0076293 | A1 | 4/2004 | Smeets et al. |
| 2004/0098429 | A1 | 5/2004 | Crispin et al. |
| 2004/0103286 | A1 | 5/2004 | Geiringer |
| 2004/0185785 | A1 | 9/2004 | Mir et al. |
| 2004/0230814 | A1 | 11/2004 | Lundvall et al. |
| 2005/0036610 | A1 | 2/2005 | Krell et al. |
| 2005/0097153 | A1 | 5/2005 | Dirscheri |
| 2005/0193217 | A1 | 9/2005 | Case |
| 2006/0039558 | A1 | 2/2006 | Morii |
| 2006/0294312 | A1 | 12/2006 | Walmsley |
| 2007/0005672 | A1 | 1/2007 | Yushiya |
| 2007/0033252 | A1 | 2/2007 | Wilber |
| 2007/0165842 | A1 | 7/2007 | Lecomte et al. |
| 2007/0174374 | A1 | 7/2007 | Inoha |
| 2008/0010331 | A1 | 1/2008 | Janke |
| 2008/0044014 | A1 | 2/2008 | Corndorf |
| 2008/0177812 | A1 | 7/2008 | Brandle |
| 2008/0181403 | A1 | 7/2008 | Sakamoto |
| 2008/0258825 | A1 | 10/2008 | Gressel |
| 2008/0263117 | A1 | 10/2008 | Rose et al. |
| 2008/0279370 | A1 | 11/2008 | Hatakeyama |
| 2008/0281892 | A1 | 11/2008 | Hemming |
| 2009/0089578 | A1 | 4/2009 | King et al. |
| 2009/0262928 | A1 | 10/2009 | Busari |
| 2009/0300335 | A1 | 12/2009 | Muff |
| 2009/0304179 | A1 | 12/2009 | Gressel et al. |
| 2010/0002877 | A1 | 1/2010 | Zhang |
| 2010/0017622 | A1 | 1/2010 | Grinchuk et al. |
| 2010/0070549 | A1 | 3/2010 | Nagaraj |
| 2011/0270676 | A1 | 11/2011 | Vassilvitskii |
| 2012/0079281 | A1 | 3/2012 | Lowenstein et al. |
| 2013/0010952 | A1 | 1/2013 | Muise |
| 2013/0262543 | A1 | 10/2013 | Abdoo et al. |
| 2013/0262725 | A1 | 10/2013 | Ito |
| 2014/0164458 | A1 | 6/2014 | Tkacik |
| 2014/0270162 | A1 | 9/2014 | Greiner et al. |
| 2014/0280414 | A1 | 9/2014 | Greiner et al. |
| 2015/0049870 | A1 | 2/2015 | Greiner et al. |
| 2015/0055778 | A1 | 2/2015 | Cox et al. |
| 2015/0081751 | A1 | 3/2015 | Greiner et al. |
| 2016/0202984 | A1 | 7/2016 | Greiner et al. |
| 2017/0041135 | A1 | 2/2017 | Greiner |

FOREIGN PATENT DOCUMENTS

| | | |
|---|---|---|
| CN | 101663642 A | 3/2010 |
| CN | 102084366 A | 6/2011 |
| CN | 105190534 A | 12/2015 |
| EP | 0582083 A1 | 2/1994 |
| JP | 2005534235 A | 11/2005 |
| JP | 2006337429 A | 12/2006 |
| JP | 2009-506438 A | 2/2009 |
| JP | 2010152468 A | 7/2010 |
| JP | 2016-517561 A | 2/2014 |
| JP | 2016-517562 A | 6/2016 |

OTHER PUBLICATIONS

Barker, Elaine et al., "Recommendation for Random Number Generation Using Deterministic Random Bit Generators," NIST Special Publication 800-90A, Computer Security Division, Information Technology Laboratory, Jan. 2012, pp. 1-128.

"Secure Hash Standard (SHS)," Federal Information Processing Standards, FIPS PUB 180-4, Mar. 2012, pp. 1-30.

Greiner et al., "List of IBM Patents or Patent Applications Treated as Related", U.S. Appl. No. 15/819,459, filed Nov. 21, 2017, dated Dec. 20, 2017 (2 pages).

* cited by examiner

INSTRUCTION FOR PERFORMING A PSEUDORANDOM NUMBER SEED OPERATION

CROSS-REFERENCE TO RELATED APPLICATIONS

This application is a continuation of U.S. patent application Ser. No. 15/237,859, filed Aug. 16, 2016, entitled "INSTRUCTION FOR PERFORMING A PSEUDORANDUM NUMBER SEED OPERATION", which is a continuation of U.S. patent application Ser. No. 14/550,979, filed Nov. 22, 2014, entitled "INSTRUCTION FOR PERFORMING A PSEUDORANDOM NUMBER SEED OPERATION," which issued on Aug. 23, 2016, as U.S. Pat. No. 9,424,000 B2, and which is a continuation of U.S. patent application Ser. No. 13/827,360, filed Mar. 14, 2013, entitled "INSTRUCTION FOR PERFORMING A PSEUDORANDOM NUMBER SEED OPERATION," which issued on Dec. 1, 2015, as U.S. Pat. No. 9,201,629 B2, each of which is hereby incorporated herein by reference in its entirety.

BACKGROUND

One or more aspects relate, in general, to processing within a computing environment, and in particular, to processing associated with generating pseudorandom numbers to be used in computer applications or other types of applications.

Pseudorandom numbers are numbers that appear random, but are not truly random. They are numbers generated by a deterministic computational process that provides statistically random numbers. Since the numbers are produced by a deterministic process, a given sequence of numbers can be reproduced at a later date, if the starting point is known. That is, given a particular function and seed value, the same sequence of numbers is generated by the function.

Pseudorandom numbers are used in numerous computer applications, such as simulation, cryptography, and procedural generation, as examples. Various implementations exist to generate pseudorandom numbers that can be used in these applications. These implementations include, for example, library subroutines, as well as a limited function of the Cipher Message with Chaining instruction available on some processors, such as IBM® z/Architecture capable processors.

SUMMARY

Shortcomings of the prior art are overcome and advantages are provided through the provision of a computer program product for executing a machine instruction. The computer program product includes computer readable storage medium readable by a processing circuit and storing instructions for execution by the processing circuit for performing a method. The method includes obtaining, by a processor, a machine instruction for execution, the machine instruction being defined for computer execution according to a computer architecture, the machine instruction having associated therewith: an opcode field to provide an opcode, the opcode to identify a perform pseudorandom number operation; and a register field to be used to identify a register, the register to specify a location in memory of an operand to be used by the machine instruction; and executing the machine instruction, the executing including: obtaining a modifier indicator from a register associated with the machine instruction; based on the modifier indicator having a first value, performing a deterministic pseudorandom number seed operation, the deterministic pseudorandom number seed operation including: obtaining seed material based on information included in the operand; using a selected hash technique and the seed material to provide one or more seed values; and storing the one or more seed values in a parameter block associated with the machine instruction.

Computer-implemented methods and systems relating to one or more aspects are also described and may be claimed herein. Further, services relating to one or more aspects are also described and may be claimed herein.

Additional features and advantages are realized through the techniques of one or more aspects. Other embodiments and aspects are described in detail herein and are considered a part of the claims.

BRIEF DESCRIPTION OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

In one aspect, a machine instruction is provided for generating pseudorandom numbers. The instruction, referred to as a Perform Pseudorandom Number Operation instruction, includes capabilities to instantiate one or more seed values to be used to generate pseudorandom numbers, reseed one or more seed values, and/or generate pseudorandom numbers. As one example, the instruction uses a 512-bit secure hash algorithm (SHA-512) specified by the National Institute of Standards and Technology (NIST). It complies with the latest NIST recommendations for pseudorandom number generation. For performance reasons, however, the instruction operates in a right-to-left manner, rather than a left-to-right manner, as specified by NIST. In further embodiments, the instruction is extendable to use alternate encoding algorithms (also referred to as techniques).

Figure 1A:
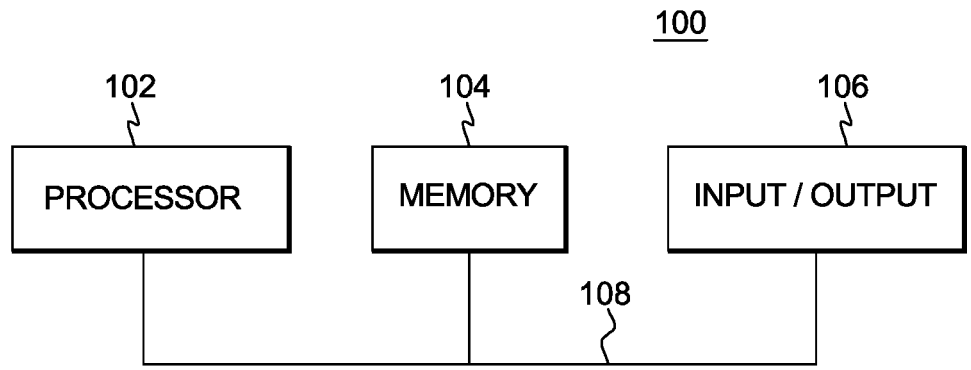
FIG. 1A depicts one example of a computing environment to incorporate and use one or more aspects.

One embodiment of a computing environment to incorporate and use one or more aspects is described with reference to FIG. 1A. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one example, processor 102 is based on the z/Architecture offered by International Business Machines Corporation, and is part of a server, such as the System z server, which is also offered by International Business Machines Corporation and implements the z/Architecture. One embodiment of the z/Architecture is described in an IBM® publication entitled, "z/Architecture Principles of Operation," IBM® Publication No. SA22-7832-09, Tenth Edition, September, 2012, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation, Armonk, N.Y., USA. Other names used herein may be registered trademarks, trademarks, or product names of International Business Machines Corporation or other companies.

In a further embodiment, processor 102 is based on the Power Architecture offered by International Business Machines Corporation. One embodiment of the Power Architecture is described in "Power ISA™ Version 2.06 Revision B," International Business Machines Corporation, Jul. 23, 2010, which is hereby incorporated herein by reference in its entirety. POWER ARCHITECTURE® is a registered trademark of International Business Machines Corporation.

In yet a further embodiment, processor 102 is based on an Intel architecture offered by Intel Corporation. One embodiment of the Intel architecture is described in "Intel® 64 and IA-32 Architectures Developer's Manual: Vol. 2B, Instructions Set Reference, A-L," Order Number 253666-045US, January 2013, and "Intel® 64 and IA-32 Architectures Developer's Manual: Vol. 2B, Instructions Set Reference, M-Z," Order Number 253667-045US, January 2013, each of which is hereby incorporated herein by reference in its entirety. Intel® is a registered trademark of Intel Corporation, Santa Clara, Calif.

Figure 1B:
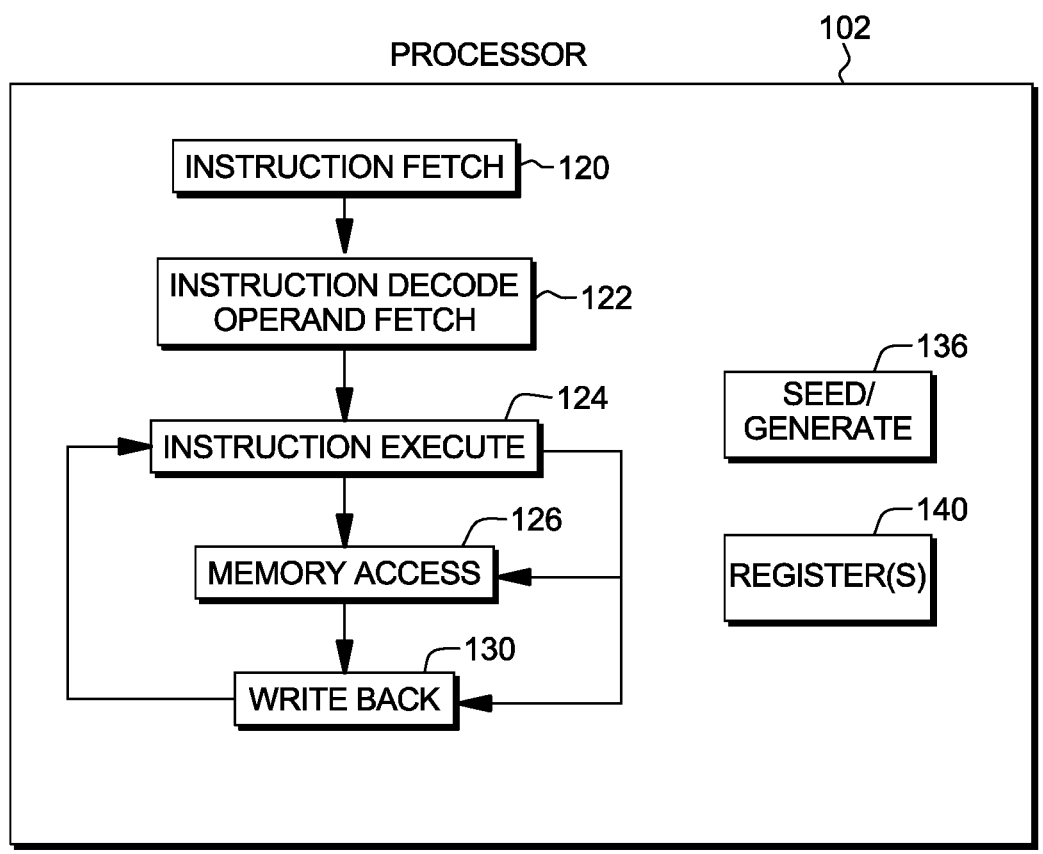
FIG. 1B depicts further details of the processor of FIG. 1A.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with an aspect, provide pseudorandom number seed and/or generate functionality by including at least a portion of or having access to a seed/generate component 136. This functionality is described in further detail below.

Processor 102 also includes, in one embodiment, one or more registers 140 to be used by one or more of the functional components.

Figure 2A:
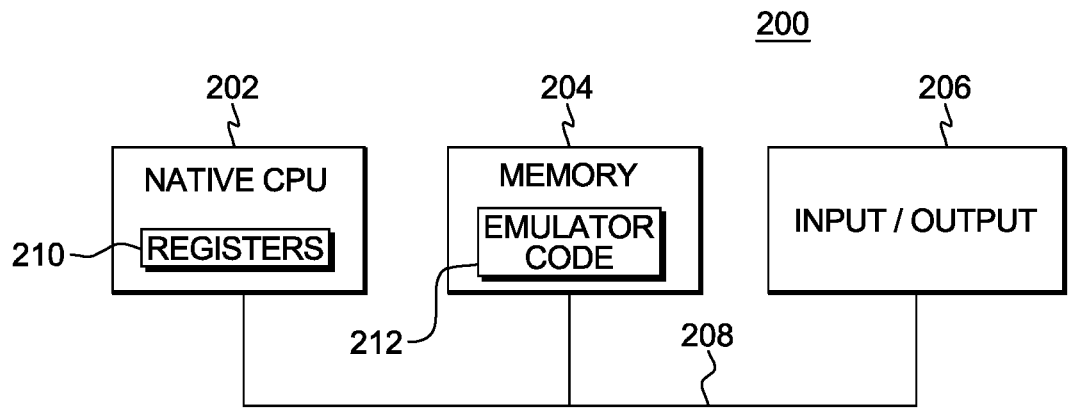
FIG. 2A depicts another example of a computing environment to incorporate and use one or more aspects.

Another embodiment of a computing environment to incorporate and use one or more aspects is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor, a pSeries server or an xSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate another architecture. For instance, emulator code 212 allows machines based on architectures other than the z/Architecture, such as PowerPC processors, pSeries servers, xSeries servers, HP Superdome servers or others, to emulate the z/Architecture and to execute software and instructions developed based on the z/Architecture.

Figure 2B:
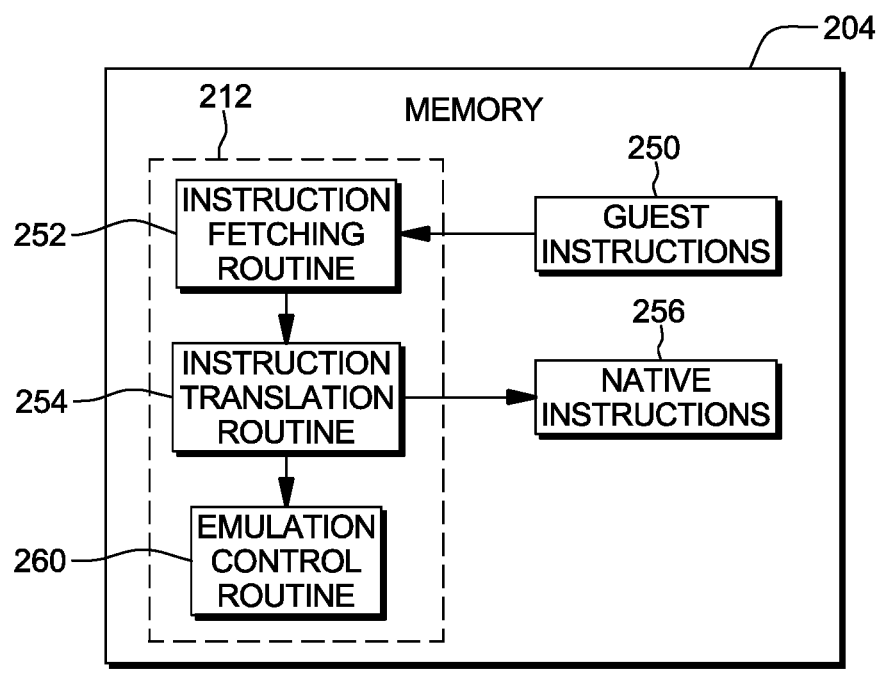
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is the Perform Pseudorandom Number Operation instruction described herein. The instruction, which is of one architecture (e.g., the z/Architecture), is fetched from memory, translated and represented as a sequence of native instructions 256 of another architecture (e.g., PowerPC, pSeries, xSeries, Intel, etc.). These native instructions are then executed.

Details relating to the Perform Pseudorandom Number Operation instruction, including explicit and implied fields of the instruction, as well as execution by a central processing unit (either in a native or emulated system), are described herein. The Perform Pseudorandom Number Operation instruction includes a generate operation to generate pseudorandom numbers, as well as a seed operation to initiate or reseed one or more seed values used to generate the pseudorandom numbers. The seed values are stored in a parameter block accessed by the instruction.

Figure 3A:
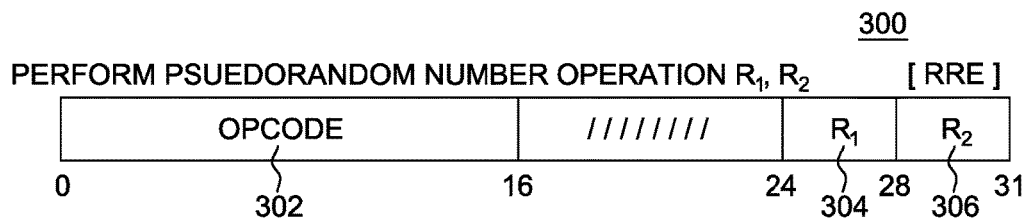
FIG. 3A depicts one embodiment of a format of a Perform Pseudorandom Number Operation instruction.

Referring initially to FIG. 3A, one embodiment of a Perform Pseudorandom Number Operation instruction is described. In one example, a Perform Pseudorandom Number Operation instruction 300 includes an opcode field 302 (e.g., bits 0-15) having an opcode (e.g., 'B93C') to indicate a perform pseudorandom number operation; a first register field 304 (e.g., bits 24-27) used to designate at least one first register ($R_1$); and a second register field 306 (e.g., bits 28-31) used to designate at least one second register ($R_2$). Each of the fields 304-306, in one example, is separate and independent from the opcode field. Further, in one embodiment, they are separate and independent from one another; however, in other embodiments, more than one field may be combined.

In one example, selected bits (e.g., the first two bits) of the opcode designated by opcode field 302 specify the length of the instruction. In this particular example, the selected bits indicate that the length is two halfwords. Further, the format of the instruction is a register-and-register operation with an extended opcode field. With this format, the contents of the register designated by the $R_1$ field are called the first operand. The register containing the first operand is sometimes referred to as the first operand location. Further, the $R_2$ field designates the register containing the second operand, and $R_2$ may designate the same register as the $R_1$ field.

In addition to $R_1$ and $R_2$ encoded in the instruction, one implementation of the instruction uses one or more implied registers including, for instance, general register 0 (GR0) and general register 1 (GR1). Each of the registers is further described below with reference to FIGS. 3B-3G.

Figure 3B:
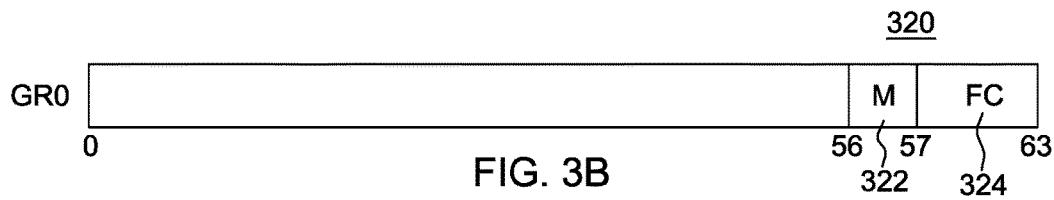
FIG. 3B depicts one example of the contents of general register 0 (GR0) to be used by the Perform Pseudorandom Number Operation instruction of FIG. 3A.

Referring initially to FIG. 3B, one embodiment of a format of general register 0 (320) is described. In one example, general register 0 includes a modifier (M) bit 322 (e.g., bit 56), and a function code (FC) field 324 (e.g., bits 57-63). The function code field includes a function code specifying a function to be performed. In one example, the assigned function codes include: code 0 for a query function, which has an assigned parameter block size of 16; and code 3 for an SHA-512-DRNG (Deterministic Random Number Generator) function, which has an assigned parameter block size of 240. Should bits 57-63 of general register 0 designate an unassigned or uninstalled function code, a specification exception is recognized.

The query function (function code 0) provides the means of indicating the availability of other functions, including, but not limited to, other random or pseudorandom number generator functions. The $R_1$ and $R_2$ fields and the contents of general register 1 are ignored for the query function.

In this embodiment, for functions other than the query function, bit 56 is the modifier bit used to indicate a particular operation to be performed. For instance, when the modifier bit is zero, a generate operation is performed, and when the modifier bit is 1, a seed operation is performed. The modifier bit is ignored for the query function. All other bits of general register 0 are ignored in one implementation.

In a further embodiment, if other functions are provided, they may or may not use the modifier bit.

Use of the function code and modifier bit are further described with reference to FIGS. 3H and 3I. Initially, referring to FIG. 3H, a Perform Pseudorandom Number Operation instruction is obtained, STEP 379, and executed. During execution, in one embodiment, a function code specified in general register 0 is obtained, STEP 380. A determination is made, based on the function code, as to the function to be performed, STEP 382. As examples, the function may be a query function or a random number generator function, such as the SHA-512-DRNG function, or other types of random number generator functions, or other functions.

Thereafter, a determination is made as to whether the function specified by the function code uses the modifier indicator, INQUIRY 384. If the modifier indicator is not used, then processing proceeds with performing the designated function, STEP 386. Otherwise, the modifier indicator is obtained, STEP 388, and processing proceeds based on the modifier indicator, STEP 390.

One embodiment of use of the modifier indicator is further described with reference to FIG. 3I. Initially, a determination is made as to the value of the modifier indicator, INQUIRY 392. In one particular example in which the function code indicates the SHA-512-DRNG function, a determination is made as to whether the value of the modifier indicator is either a 0 or a 1.

If the value of the modifier bit is 0, then the generate operation of the SHA-512-DRNG function is performed, STEP 394. This includes, for instance, generating, for each block of memory of the first operand, a hash value using the 512 bit secure hash technique and one or more seed values in the parameter block; and storing at least a portion of the generated hash value in the first operand.

Otherwise, if the value of the modifier bit is 1, then a seed operation is performed, STEP 396. This includes, for instance, obtaining seed material, which is formed based on a value of a reseed counter and using information included in the second operand of the instruction; using the seed material and the 512 bit secure hash technique to provide one or more seed values; and storing the seed value(s) in the parameter block.

In other embodiments in which the function code represents other types of random number generator functions, the same modifier bit values may be used to determine whether a generate or seed operation is to be performed for that random number generator function. Additionally, in further embodiments, for other types of function codes specifying other types of functions, the value of the modifier indicator may specify different operations than described herein. Many variations are possible.

Figure 3C:
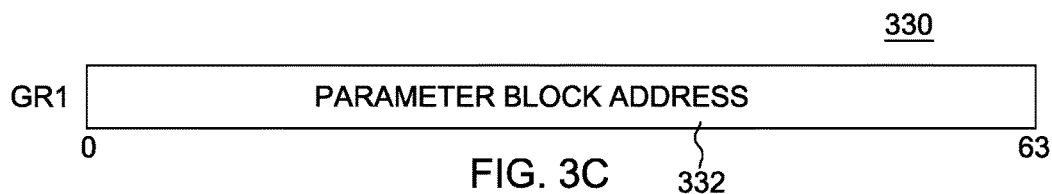
FIG. 3C depicts one example of the contents of general register 1 (GR1) to be used by the Perform Pseudorandom Number Operation instruction of FIG. 3A.

Continuing with a description of the instruction registers, referring to FIG. 3C, one embodiment of a format of general register 1 (330) is described. In one example, for functions other than the query function, general register 1 contains a logical address 332 of the leftmost byte of the parameter block in storage to be accessed and used by the instruction. The length and position of the parameter block address within general register 1 depends on the addressing mode. In the 24-bit addressing mode, the contents of bit positions 40-63 of general register 1 constitute the address, and the contents of bit positions 0-38 are ignored. In the 31-bit addressing mode, the contents of bit positions 33-63 of general register 1 constitute the address, and the contents of bit positions 0-32 are ignored. In the 64-bit addressing mode, the contents of bit positions 0-63 of general register 1 constitute the address. In the access-register mode, access register 1 specifies the address space containing the parameter block.

Figure 3D:
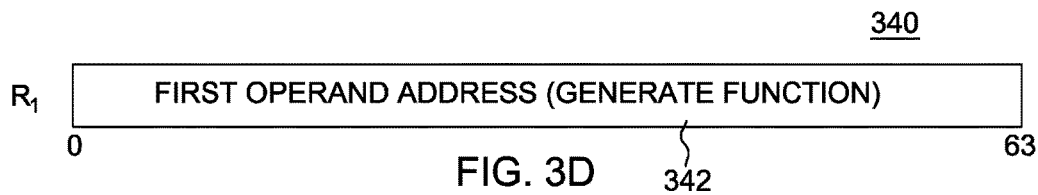
FIG. 3D depicts one example of the contents of a register $R_1$ to be used in one aspect by the Perform Pseudorandom Number Operation instruction of FIG. 3A.
Figure 3E:
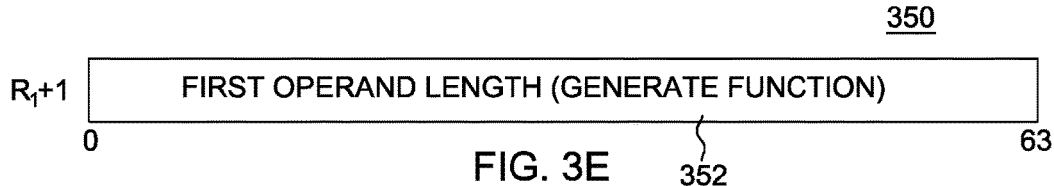
FIG. 3E depicts one example of the contents of a register $R_1+1$ to be used in one aspect by the Perform Pseudorandom Number Operation instruction of FIG. 3A.
Figure 3F:
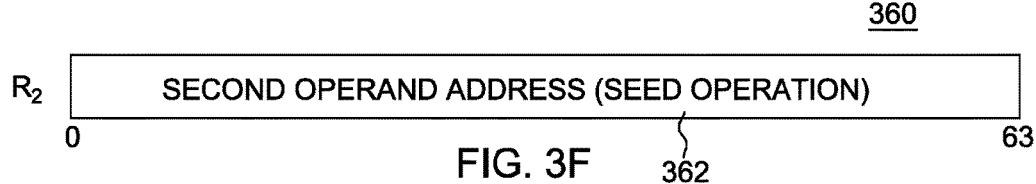
FIG. 3F depicts one example of the contents of a register $R_2$ to be used in one aspect by the Perform Pseudorandom Number Operation instruction of FIG. 3A.
Figure 3G:
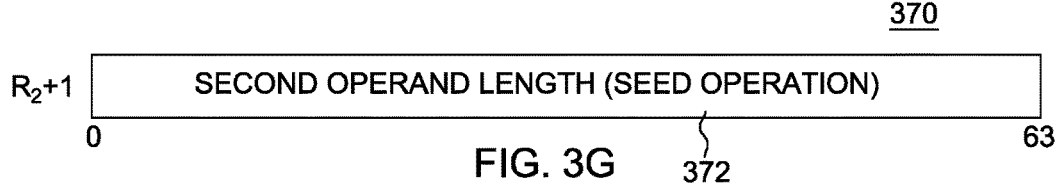
FIG. 3G depicts one example of the contents of a register $R_2+1$ to be used in one aspect by the Perform Pseudorandom Number Operation instruction of FIG. 3A.
Figure 3H:
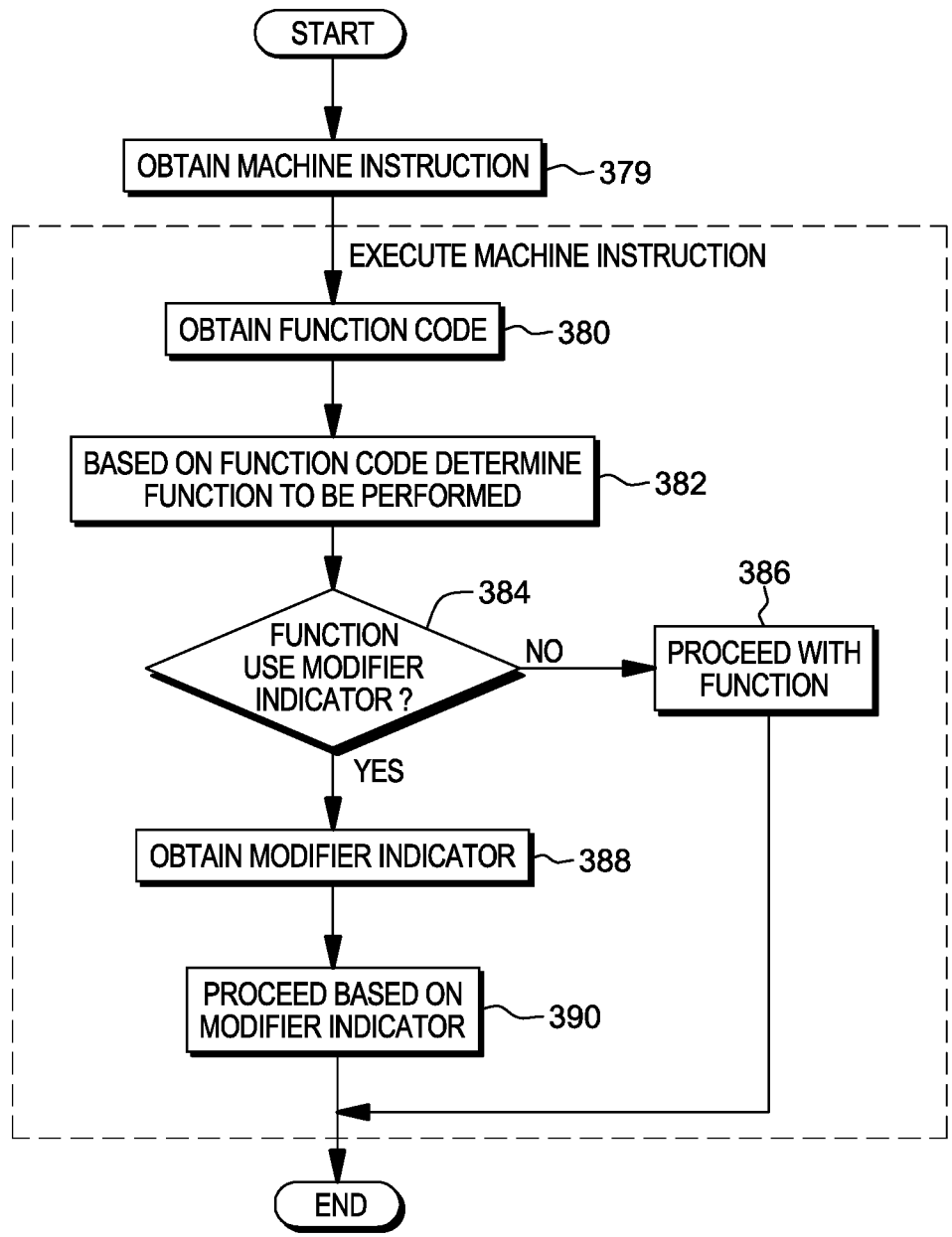
FIG. 3H depicts one example of processing associated with a function code specified by the Perform Pseudorandom Number Operation instruction of FIG. 3A.
Figure 3I:
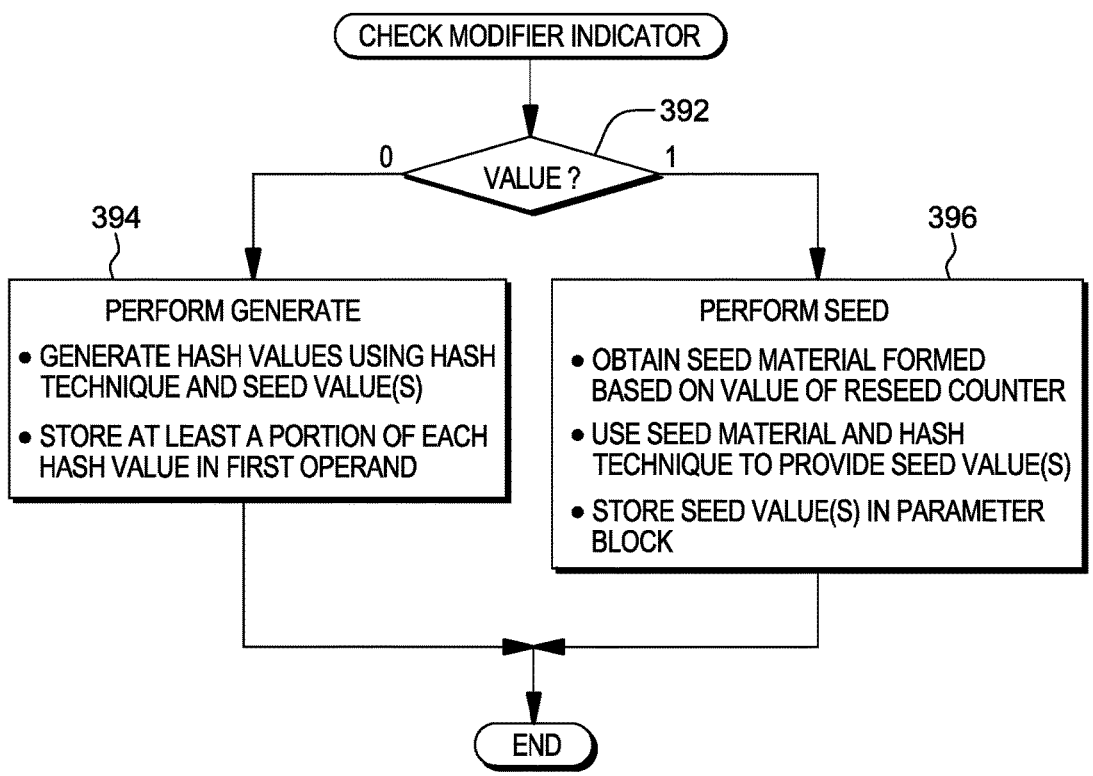
FIG. 3I depicts one example of processing associated with checking a modifier indicator specified by the Perform Pseudorandom Number Operation instruction of FIG. 3A.

FIG. 3D depicts one example of the contents of $R_1$ (340) designated by $R_1$ field 304 (FIG. 3A). In particular, for the generate operation, the $R_1$ field designates an even-odd pair of general registers and is to designate an even-numbered register other than general register 0; otherwise, a specification exception is recognized. The contents of general register $R_1$ specify a location in memory of the first operand. In particular, the contents of $R_1$ specify an address 342 of the leftmost byte of the first operand. The length 352 (FIG. 3E) of the first operand is specified in general register $R_1+1$ (350). The $R_2$ field is ignored by the generate operation.

For a seed operation, the $R_2$ field 306 (FIG. 3A) designates an even-odd pair of general registers and is to designate an even-numbered register other than general register 0; otherwise, a specification exception is recognized. The contents of general register $R_2$ (360, FIG. 3F) specify a location in memory of the second operand. In particular, the contents of $R_2$ specify an address 362 of the leftmost byte of the second operand. The length 372 (FIG. 3G) of the second operand is specified in general register $R_2+1$ (370). The $R_1$ field is ignored by a seed operation.

Regardless of whether a generate or seed operation is specified, the contents of the even-numbered general register designating the storage operand ($R_1$ or $R_2$, respectively) are subject to the addressing mode. In the 24-bit addressing mode, the contents of bit positions 40-63 of the register constitute the address of the storage operand, and the contents of bit positions 0-39 are ignored. In the 31-bit addressing mode, the contents of bit positions 33-63 of the register constitute the address of the storage operand, and the contents of bit positions 0-32 are ignored. In the 64-bit addressing mode, the contents of bit positions 0-63 of the register constitute the address of the storage operand. In the access-register mode, the respective access register ($R_1$ or $R_2$) specifies the address space containing the storage operand.

Regardless of whether a generate or seed operation is specified, in both the 24-bit and the 31-bit addressing modes, the contents of bit positions 32-63 of the odd-numbered general register ($R_1+1$ or $R_2+1$, respectively) form a 32-bit unsigned binary integer which specifies the number of bytes in the storage operand. In the 64-bit addressing mode, the contents of bit positions 0-63 of the register form a 64-bit unsigned binary integer which specifies the number of bytes in the storage operand.

For a generate operation, the first operand length is updated in general register $R_1+1$ at the completion of the instruction. In both the 24-bit and the 31-bit addressing modes, the updated value replaces the contents of bit positions 32-63 of general register $R_1+1$; the contents of bit positions 0-31 of general register $R_1+1$ remain unchanged. In the 64-bit addressing mode, the updated value replaces the contents of general register $R_1+1$.

When the parameter block overlaps any portion of the storage operand, the results are unpredictable.

When the storage operand length is zero, access exceptions for the storage operand location are not recognized. However, the parameter block is accessed even when the storage operand length is zero. For a generate operation, when the storage operand length is zero, general register $R_1+1$ is not changed, and condition code 0 is set.

As observed by other CPUs and the I/O subsystem, references to the parameter block and storage operand may be multiple access references, accesses to these locations are not necessarily block concurrent, and the sequence of these accesses or references is undefined.

For a generate operation, when a PER (Program Event Recording—implemented on, for instance, processors based on the z/Architecture) storage alteration event is recognized, fewer than 4K additional bytes are stored into the first operand location before the event is reported. When a PER storage alteration event is recognized both for the first operand location and for the portion of the parameter block that is stored, it is unpredictable which of these two locations is indicated in the PER access identification (PAID) and PER ASCE ID (Program Event Recording address space control element identification (AI)). Similarly, when a PER zero-address-detection event is recognized for both for the first operand location and for the parameter block, it is unpredictable which of these two locations is identified in the PAID and AI.

For a generate operation, access exceptions may be reported for a larger portion of the first operand than is processed in a single execution of the instruction. However, access exceptions are not recognized for locations that do not encompass the first operand nor for locations more than 4K bytes from the current location being processed.

For a generate operation, when the operation ends due to normal completion, condition code 0 is set and the resulting value in general register $R_1+1$ is zero. When the operation ends due to partial completion, condition code 3 is set and the resulting value in general register $R_1+1$ is nonzero.

Figure 4A:
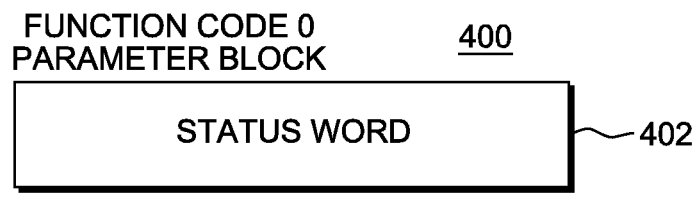
FIG. 4A depicts one example of the format of a parameter block for use by a Perform Pseudorandom Number Operation instruction having a function code of 0.

In one implementation, when the function code of the Perform Pseudorandom Number Operation instruction is 0 indicating a query function, a 128-bit status word 402 (FIG. 4A) is stored in a parameter block 400 associated with the instruction. Bits 0-127 of this field correspond to function codes 0-127, respectively, of the Perform Pseudorandom Number Operation instruction. When a bit is one, the corresponding function is installed; otherwise, the function is not installed. For instance, if the SHA-512 DRNG function is installed, bit 3, corresponding to function code 3, is set to one.

Condition code 0 is set when execution of the Query function completes; condition code 3 is not applicable to this function.

In one implementation, when the function code of the Perform Pseudorandom Number Operation instruction is 3, a deterministic random number generator (DRNG) function is performed. Depending on the modifier bit, bit 56 of general register 0, the DRNG function performs either a deterministic pseudorandom number generate operation or a deterministic pseudorandom number seed operation, each using the 512-bit secure hash algorithm (SHA-512).

Deterministic pseudorandom number generation, also known as deterministic random bit generation, is defined in, for instance, *Recommendation for Random Number Generation Using Deterministic Random Bit Generators*, National Institute of Standards and Technology (NIST), NIST Special Publication 800-90A, January 2012, which is hereby incorporated herein by reference in its entirety. Further, a description of the secure hash algorithm is found in, for instance, Secure Hash Standard (SHS), Federal Information Processing Standards Publication, FIPS PUB 180-4, National Institute of Standards and Technology, Gaithersburg, Md., March 2012, which is hereby incorporated herein by reference in its entirety.

Figure 4B:
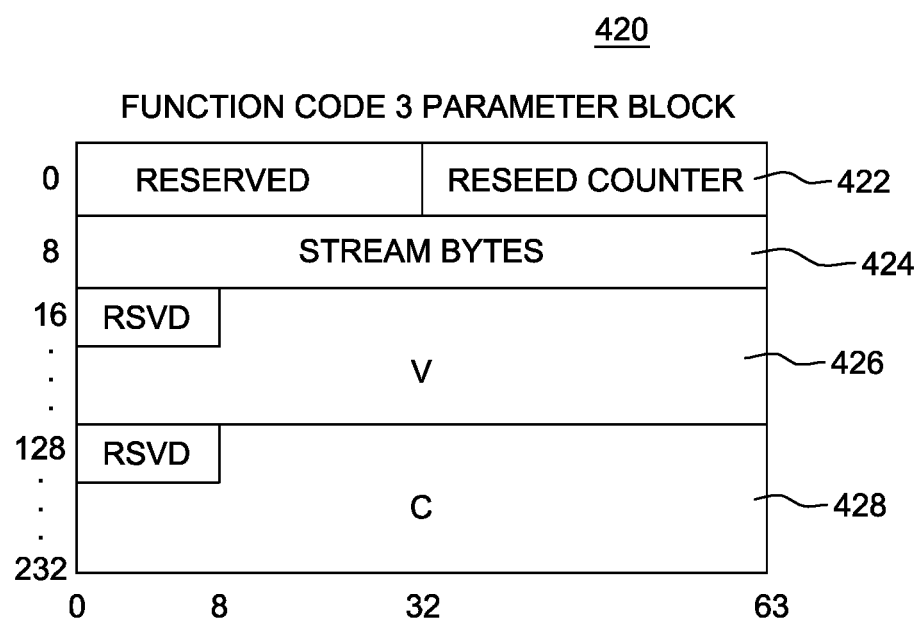
FIG. 4B depicts one embodiment of the format of a parameter block for use by a Perform Pseudorandom Number Operation instruction having a function code of 3.

One embodiment of a parameter block used for the DRNG function is depicted in FIG. 4B. Parameter block 420 represents the internal state of a deterministic random number generator, and includes, for instance:

Reserved: Bytes 0-3, 16, and 128 of the parameter block are reserved.

Reseed Counter 422: Bytes 4-7 of the parameter block contain a 32-bit unsigned binary integer indicating the number of times that the instruction has completed with condition code 0 since the parameter block was last instantiated or reseeded.

When the reseed counter contains zero, the following applies:
  Execution of the seed operation causes the parameter block to be instantiated with initial values, including setting the reseed counter to a value of one.
  Execution of the generate operation results in a specification exception being recognized.

When the reseed counter contains a nonzero value, the parameter block is considered to be instantiated, and the following applies:
  Execution of the seed operation causes the parameter block to be reseeded, including resetting the reseed counter to a value of one.
  Execution of a generate operation that results in condition code 0 causes the reseed counter to be incremented by one; any carry out of bit position 0 of the reseed counter field is ignored.

Stream Bytes 424: Bytes 8-15 of the parameter block contain a 64-bit unsigned binary integer. The stream bytes field is set to zero by the execution of the seed operation when instantiating the parameter block (that is, when the reseed counter is zero); the field is not changed by the execution of the seed operation when the parameter block is already instantiated.

Partial or full completion of a generate operation causes the contents of the stream bytes field to be incremented by the number of bytes stored into the first operand; any carry out of bit position 0 of the stream bytes field is ignored.

Value (V) 426: Bytes 17-127 of the parameter block contain, for instance, an 888-bit value indicating the internal state of the random number generator represented by the parameter block. V is initialized by the execution of the seed operation when instantiating the parameter block. V is updated by either (a) the execution of the seed operation when the reseed counter is nonzero, or (b) the execution of the generate operation that ends in condition code 0.

Constant (C) 428: Bytes 129-239 of the parameter block contain, for instance, an 888-bit value indicating the internal state of the random number generator represented by the block. C is initialized by the execution of the seed operation, and inspected by the generate operation.

The same parameter block format is used by both the generate operation and the seed operation (including instantiation and reseeding). A parameter block containing all zeros is considered to be not instantiated. The program should zero the parameter block prior to issuing the seed operation to instantiate the parameter block, and subsequently, the program should not alter the contents of the parameter block except to zero it; otherwise, unpredictable results may be produced by the instruction.

Further details regarding the seed operation and the generate operation of the DRNG function (also referred to herein as the SHA-512-DRNG function) are described below.

Seed Operation

The SHA-512-DRNG seed operation instantiates or reseeds a deterministic pseudorandom number generation parameter block using the 512-bit secure hash algorithm. In one embodiment, the operation is performed by a central processing unit; however, in other embodiments, it is performed by other components or co-processors.

Depending on whether the reseed counter in bytes 4-7 of the parameter block is zero or nonzero, an instantiation or reseeding operation is performed, respectively. Further details of instantiation and reseeding are described below with reference to the figures. In the figures, the indicated symbols/abbreviations have the following meaning: <#>: length of field in bytes; $R_2+1$: the length of operand 2 in storage in the range of 0-512 bytes; # bits: 32-bit count of bits to be produced by the SHA-512 algorithm—888 bits (378 hex); ct: 8-bit counter (e.g., m used by the hash derivation function); z: 8-bit field of zeros.

Figure 5A:
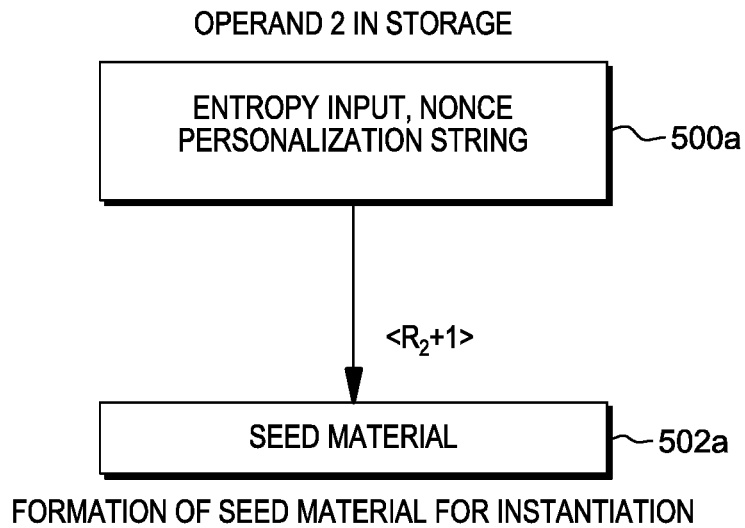
FIG. 5A depicts one embodiment of the formation of seed material for an instantiation operation.

For the instantiation operation, as depicted in FIG. 5A, the second operand in storage 500a includes one or more of entropy input, nonce, and an optional personalization string, each of which is described below. This information is used to form seed material 502a.

As an example, entropy input is an input bitstring that provides an assessed minimum amount of unpredictability for a Deterministic Random Bit Generator (DRBG) mechanism. A DRBG mechanism is the portion of a random bit generator (RBG) that includes the functions to instantiate and uninstantiate the RBG, generate pseudorandom bits, optionally reseed the RBG, and test the health of the DRBG mechanism.

A Random Bit Generator (RBG) is a device, algorithm, technique or mechanism that outputs a sequence of binary bits that appear to be statistically independent and unbiased. One example of an RBG is a DRBG. A DRBG is, for instance, an RBG that includes a DRBG mechanism and (at least initially) has access to a source of entropy input. The DRBG produces a sequence of bits from a secret initial value called a seed, along with other possible inputs.

A seed is a string of bits that is used as input to a DRBG mechanism. The seed determines a portion of the internal state of the DRBG, and its entropy is to be sufficient to support the security strength of the DRBG. Entropy is a measure of the disorder, randomness or variability in a closed system. Min-entropy is the measure used in one implementation The min-entropy (in bits) of a random variable X is the largest value m having the property that each observation of X provides at least m bits of information (i.e., the min-entropy of X is the greatest lower bound for the information content of potential observations of X). The min-entropy of a random variable is a lower bound on its entropy. The precise formulation for min-entropy is $-(\log_2 \max p_1)$ for a discrete distribution having probabilities $p_1, \ldots, p_n$. Min-entropy is often used as a worst case measure of the unpredictability of a random variable.

Nonce is a time-varying value that has at most a negligible chance of repeating, e.g., a random value that is generated anew for each use, a timestamp, a sequence number, or some combination of these.

Personalization string is an optional string of bits that is combined with a secret entropy input and (possibly) a nonce to produce a seed.

For the reseed operation (a reseed acquires additional bits that affect the internal state of the DRBG mechanism), the second operand in storage 500b (FIG. 5B) includes entropy input and optional additional input, used to form the seed material 502b. The optional additional input may be any desired information that adds further randomness, such as a time value or other arbitrary values, as examples.

Figure 5B:
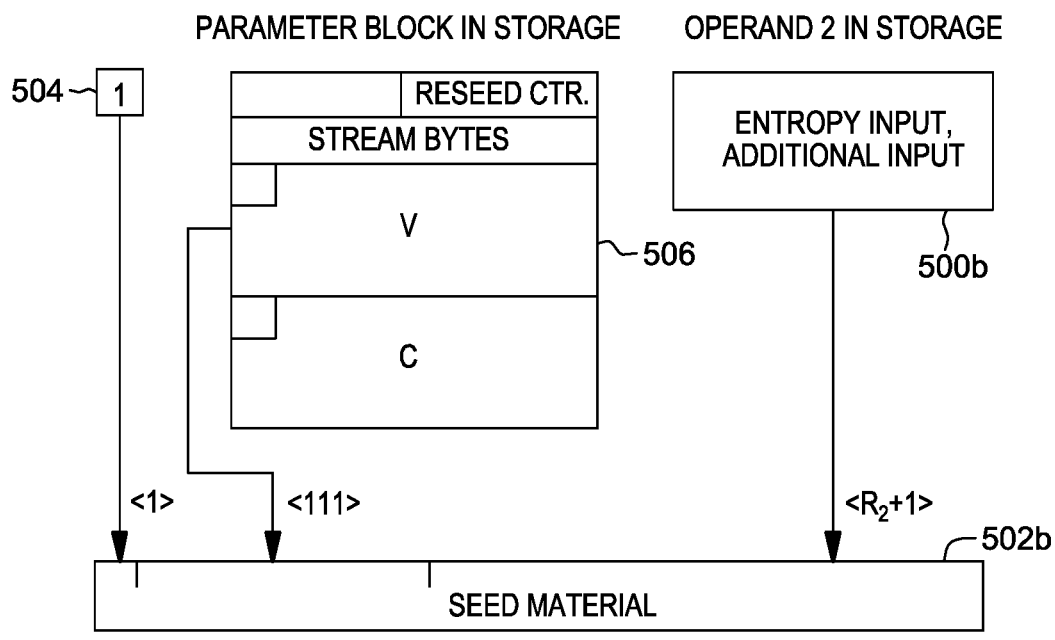
FIG. 5B depicts one embodiment of the formation of seed material for a reseed operation.

When performing an instantiation operation, seed material is formed using only the second operand, as depicted in FIG. 5A. For instance, input values of the second operand are concatenated to form the seed material. However, when performing a reseed operation, seed material is formed, as shown in FIG. 5B, from a concatenation of, for instance, the value 01 hex (504), the contents of V field 506 of the parameter block, and the contents of second operand 500b.

Figure 6:
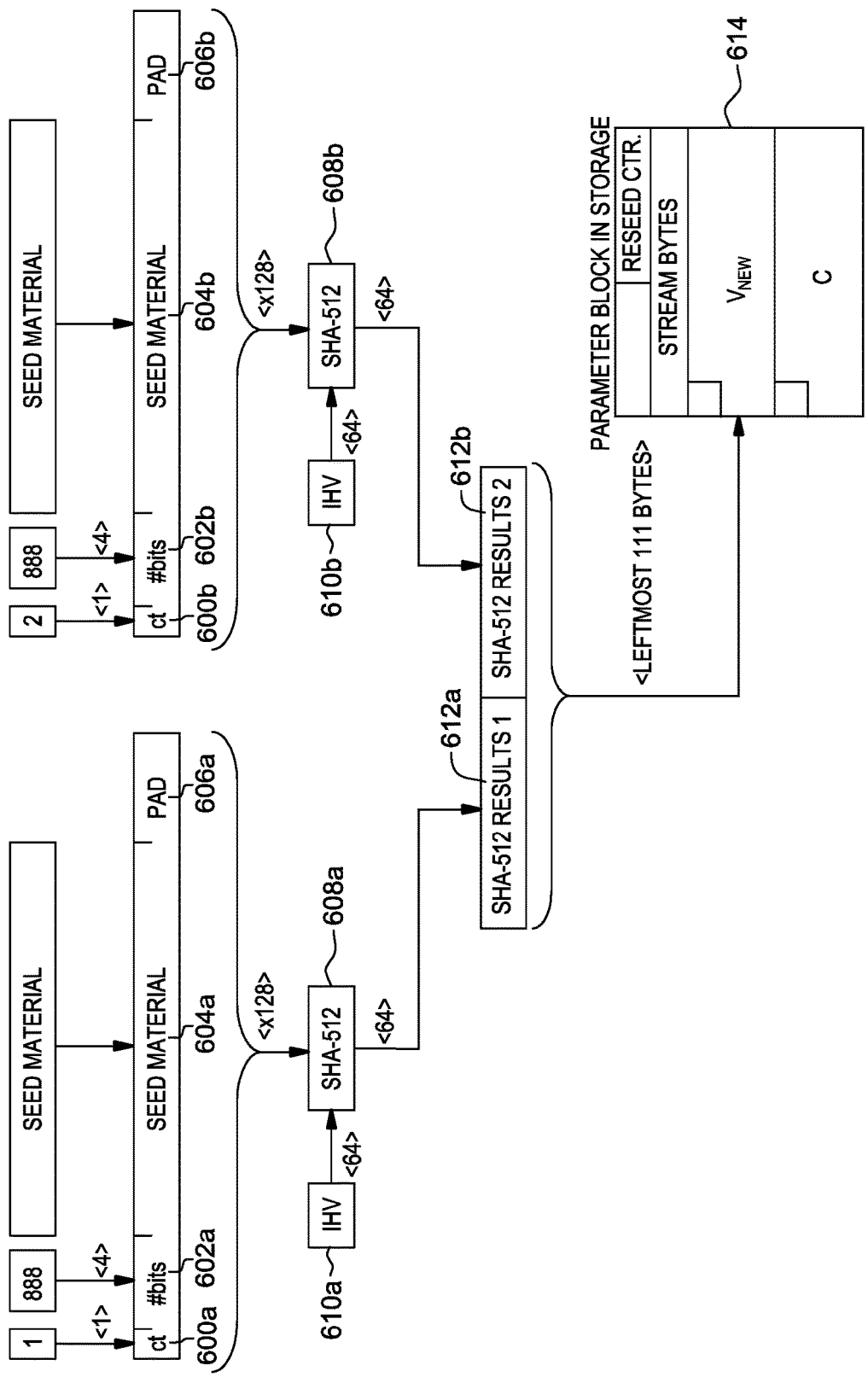
FIG. 6 depicts one embodiment of the logic to generate $V_{new}$.

For either the instantiation or reseed operation, one or more seed values are initialized/updated. One such seed value is $V_{new}$, which is formed as described with reference to FIG. 6. In one embodiment, a one byte counter 600a, a four-byte value of 888 (602a), seed material 604a (formed as described above), and padding 606a are concatenated and used as input to a SHA-512 algorithm 608a, along with an initial hash value (IHV) (also referred to as an initial chaining value (ICV)) 610a. In one embodiment, the padding is a value of 80 hex, concatenated with 0-127 bytes of zeros, concatenated with a 16-byte binary integer designating the length in bits of the input to the SHA-512 algorithm not including the padding (that is, the length of the one-byte counter, four-byte value of 888, and the seed material). The initial hash value is, for instance, a 64 byte value, and examples of such values are described further below.

The SHA-512 algorithm is invoked twice to form two 64-bit hashed results 612a, 612b; the one-byte counter 600a contains the value 1 for the first invocation of the SHA-512 algorithm, and it contains the value 2 (600b) for the second invocation. The second invocation also uses a four byte value of 888 (602b), seed material 604b, and padding 606b as input to SHA-512 algorithm 608b, along with IHV 610b to form 64-bit hashed result 612b. In this example, 602b is the same value as 602a; 604b is the same as 604a; 606b is the same as 606a; and 610b is the same as 610a. However, in other embodiments, for instance, for other techniques, the values may be different from one another.

The two 64-byte hashed results 612a, 612b are concatenated together, and, in this example, the leftmost 111 bytes of the 128-byte concatenation form the new Value field ($V_{new}$) 614 in the parameter block.

Figure 7:
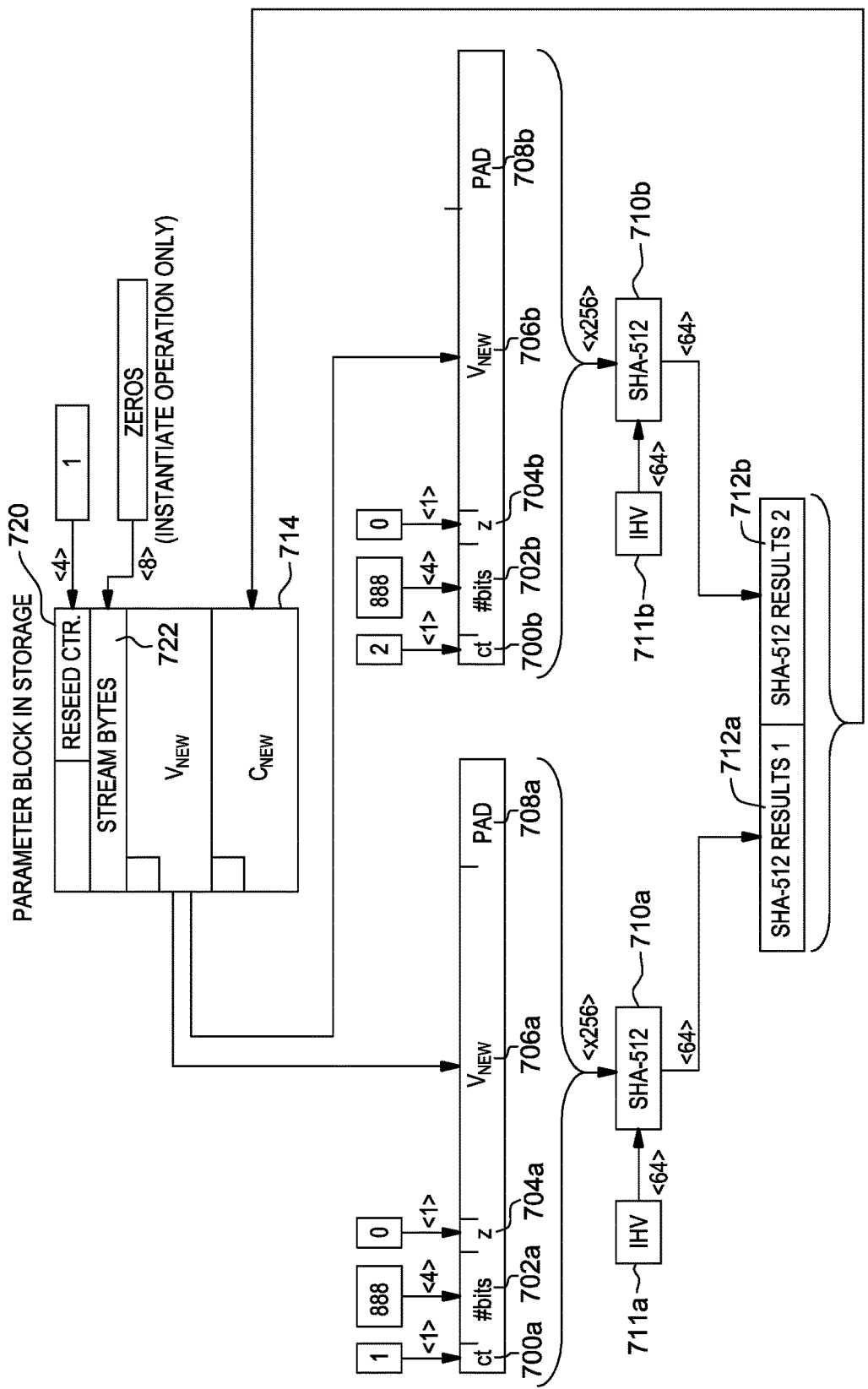
FIG. 7 depicts one example of the logic to generate $C_{new}$.

Similar to the formation of the $V_{new}$ field, a new constant field ($C_{new}$) is formed during both the instantiation or reseeding operation. $C_{new}$ is another seed value stored in the parameter block. As shown in FIG. 7, a one byte counter 700a, a four-byte value of 888 (702a), a one byte value of zero 704a, $V_{new}$ field 706a, and padding 708a are concatenated and used as input to an SHA-512 algorithm 710a, along with an IHV 711a. The padding is, for instance, a value of 80 hex, concatenated with 122 bytes of zeros, concatenated with a 16-byte binary integer designating the length in bits of the input to the SHA-512 algorithm not including the padding (that is, the length of the one-byte counter, four-byte value of 888, one-byte value of zero, and the $V_{new}$ field). IHV 711a is the same value, in one embodiment, as IHV 610a or IHV 610b.

The SHA-512 algorithm is invoked twice to form two 64-bit hashed results 712a, 712b; the one-byte counter 700a contains the value 1 for the first invocation of the SHA-512 algorithm, and it contains the value 2 (700b) for the second invocation. The second invocation also uses a four byte value of 888 (702b), a one byte value of zero (704b), $V_{new}$ field 706b, and padding 708b as input to SHA-512 algorithm 710b, along with IHV 711b. In this example, 702b is the same as 702a; 704b is the same as 704a; 706b is the same as 706a; 708b is the same as 708a; and 711b is the same as 711a. However, in other embodiments, for instance, for other techniques, they may be different from one another.

The two 64-byte hashed results 712a, 712b are concatenated together, and, in this example, the leftmost 111 bytes of the 128-byte concatenation form the new constant field ($C_{new}$) 714.

For either the instantiate or reseed operation, the reseed counter field 720 in the parameter block is set to the value of one. For the instantiate operation only, the stream bytes field 722 in the parameter block is set zeros; the stream bytes field remains unchanged by a reseed operation.

Condition code 0 is set when execution of the SHA-512-DRNG seed operation completes; condition code 3 is not applicable to the seed operation.

Generate Operation

The SHA-512-DRNG generate operation generates pseudorandom numbers using the parameter block instantiated or reseeded, as described above, as well as the 512-bit secure hash algorithm. In one embodiment, the operation is performed by a central processing unit; however, in other embodiments, it is performed by other components or co-processors.

When the first operand length in general register $R_1+1$ is nonzero, the first operand is stored in right-to-left order in units of 64-byte blocks, except that the rightmost block may contain fewer than 64 bytes. The number of blocks to be stored, including any partial rightmost block, is determined by rounding the first operand length in general register $R_1+1$ up to a multiple of 64 and dividing the value by 64. The blocks of the first operand are numbered from left to right as 0 to n−1, where n−1 represents the rightmost block.

The following procedure is performed, in one implementation, for each block of the first operand location, beginning with the rightmost (n−1) block and proceeding to the left, as described with reference to FIGS. 8A-8B. In FIG. 8B (and FIG. 9), <#> refers to the length of the field in bytes.

Figure 8A:
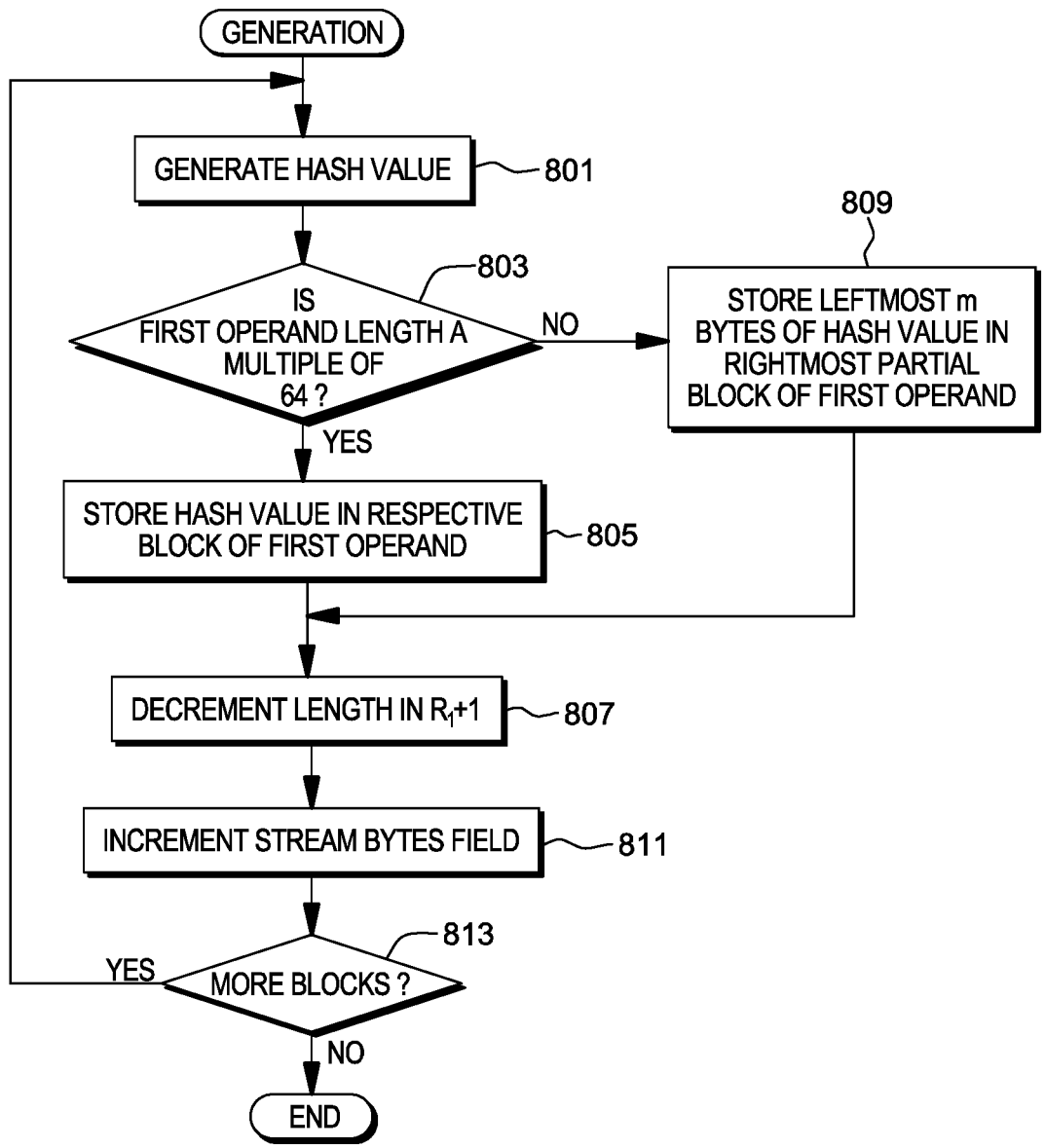
FIG. 8A depicts one embodiment of the logic to generate pseudorandom numbers.
Figure 8B:
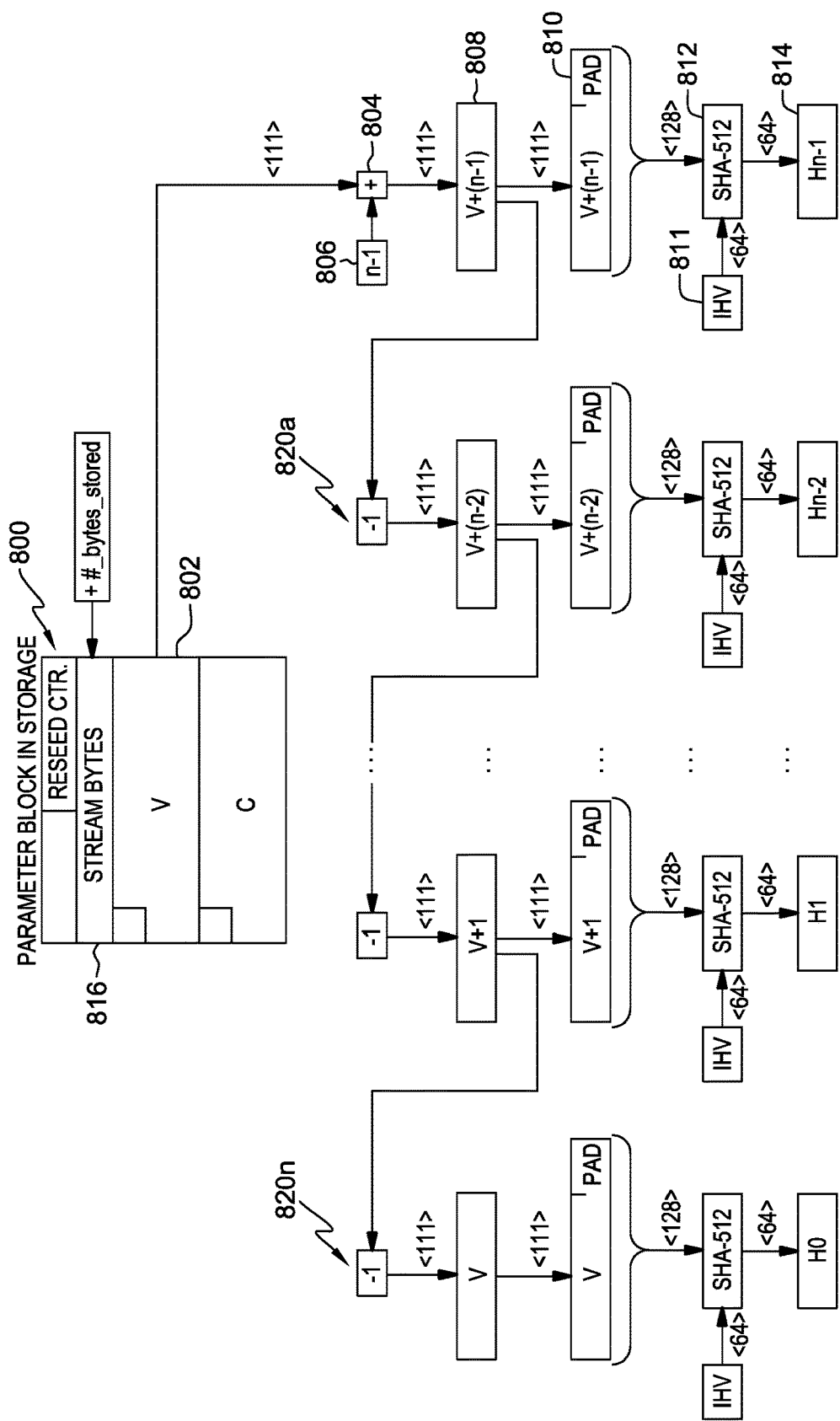
FIG. 8B depicts one example of creating hash values for use in generating pseudorandom numbers.

Referring initially to FIG. 8A, for a block of the first operand location, a hash value is generated, STEP 801. One embodiment of generating the hash value is described with reference to FIG. 8B.

1. Referring to FIG. 8B, the value (V) 802 from parameter block 800 is added 804 to the block number 806 being processed, with any overflow from the addition ignored.
2. The 111-byte sum of this addition 808, concatenated with 17 bytes of padding 810, are used as input to the SHA-512 algorithm 812, along with IHV 811, resulting in a 64-byte hashed value 814. The 17-byte padding provided to the SHA-512 algorithm is, for instance, a value of 80 hex followed by a 16-byte binary integer value of 888 (the length of V in bits). IHV 811 is the same as one of IHV 610a, 610b, 711a or 711b; or, in another embodiment, for instance, for other techniques, it may have a different value.
3. Returning to FIG. 8A, subsequent to creating the hashed value, if the first operand length in general register $R_1+1$ is a multiple of 64, INQUIRY 803, then the resulting 64-byte hashed value is stored in the respective block of the first operand location, STEP 805, and the length in general register $R_1+1$ is decremented by 64, STEP 807.

If the first operand length is not a multiple of 64, INQUIRY 803, then the leftmost m bytes of the resulting 64-byte hashed value is stored in the rightmost partial block of the first operand, where m represents the remainder of the first operand length divided by 64, STEP 809. In this case, the length in general register $R_1+1$ is decremented by m, STEP 807.
4. Regardless of whether a full or partial block is stored, stream bytes field 816 (FIG. 8B) in bytes 8-15 of parameter block 800 is incremented by the number of bytes stored into the first operand location, STEP 811 (FIG. 8A).

The above process is repeated 820a-820n until either the first operand length in general register $R_1+1$ is zero (called normal completion) or a CPU-determined number of blocks has been processed (called partial completion), INQUIRY 813 (FIG. 8A). The CPU-determined number of blocks depends on the model, and may be a different number each time the instruction is executed. The CPU-determined number of blocks is usually nonzero. In certain unusual situations, this number may be zero, and condition code 3 may be set with no progress. However, the CPU protects against endless reoccurrence of this no-progress case.

Based on performing the generate operation, the first operand includes a pseudorandom number.

When the first operand length in general register $R_1+1$ is initially zero, normal completion occurs without storing into the first operand location; however, the parameter block is updated, as described with reference to FIG. 9. Further, when the pseudorandom number generation process ends due to normal completion, the parameter block is updated as described with reference to FIG. 9.

Figure 9:
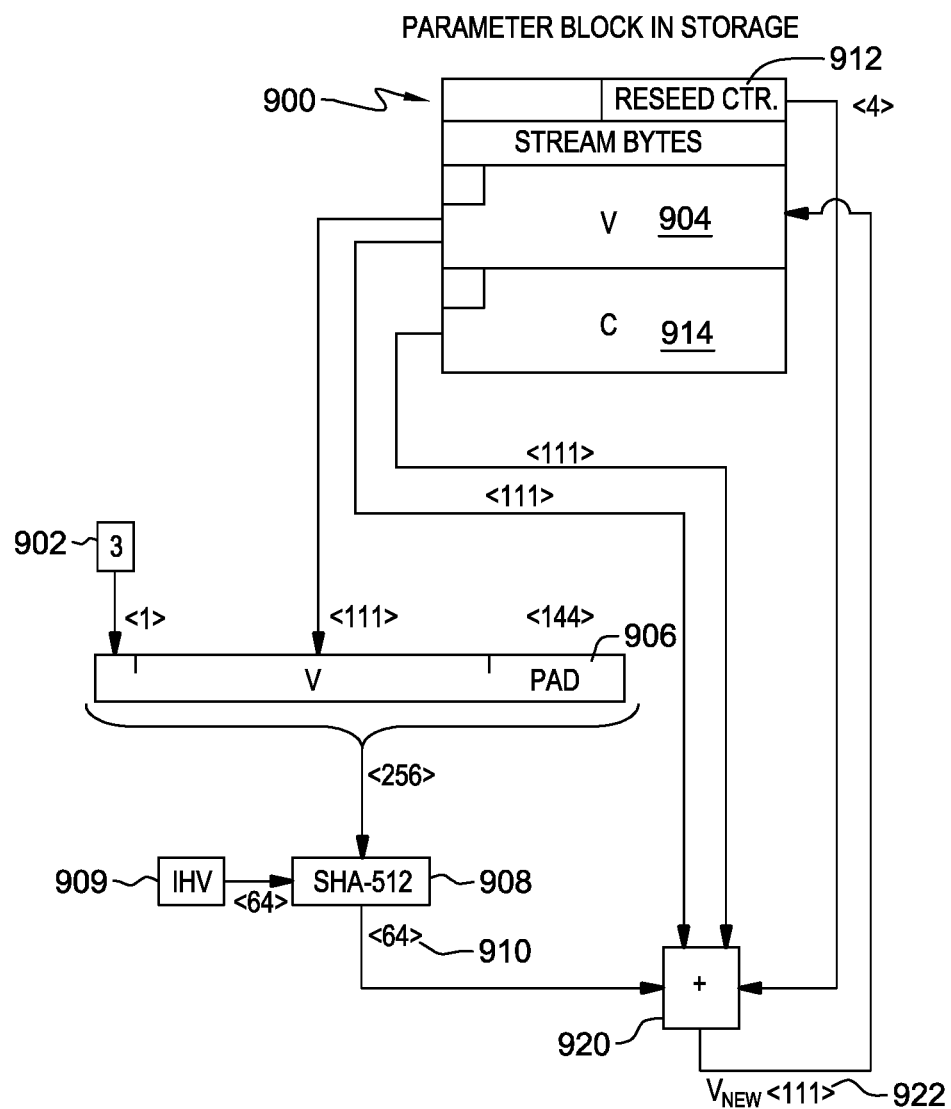
FIG. 9 depicts one embodiment of the logic to update a parameter block based on normal completion of a pseudorandom number generation operation.

Referring to FIG. 9, in one embodiment, the parameter block is updated, as follows:

1. A one byte value of 03 hex (902), a 111-byte value (V) 904 from parameter block 900, and 144 bytes of padding 906 are concatenated and used as input to the SHA-512 algorithm 908, along with IHV 909, resulting in a 64-byte hashed value 910. The padding is, for instance, a value of 80 hex, concatenated with 127 bytes of zeros, concatenated with a 16-byte binary integer designating the length in bits of the input to the SHA-512 algorithm not including the padding (that is, the length of the one-byte value of 03 hex and the V field). IHV 909 is, in one embodiment, equal to one of IHV 610a, 610b, 711a, 711b or 811; or, in another embodiment, for instance, for other techniques, it may be a different value.
2. The values of the 4-byte reseed counter field 912 and the 111-byte value (V) 904 and constant (C) 914 fields in parameter block 900, and the 64-byte hashed value (from the above computation) 910 are added 920. Any overflow from the addition is ignored, and the resulting 111-byte sum 922 replaces the Value field ($V_{new}$) 904 in parameter block 900.
3. The 4-byte reseed counter field 912 in parameter block 900 is incremented by one.
4. Condition code 0 is set.

When the pseudorandom number generation process ends due to partial completion, the first operand length in general register $R_1+1$ contains a nonzero multiple of 64, the reseed counter and value (V) fields in the parameter block are not updated, and condition code 3 is set.

In one particular embodiment, a specification exception is recognized and no other action is taken if any of the following conditions exist:

1. Bits 57-63 of general register 0 specify an unassigned or uninstalled function code.

2. The following special conditions apply to the generate operation:
   The $R_1$ field designates an odd-numbered register or general register 0.
   The reseed counter in the parameter block is zero.
3. The following special conditions apply to the seed operation:
   The $R_2$ fields designates an odd-numbered register or general register 0 (seed operation only.)
   The length in general register $R_2+1$ is greater than 512.

Condition Code
0 Normal completion
1
2
3 Partial completion (generate operation only)

Program Exceptions:
  Access (store, operand 1, generate operation; fetch, operand 2, seed operation; fetch and store, parameter block)
  Operation (if message-security-assist extension 5 (of the z/Architecture) is not installed)
  Specification
  Transaction constraint One embodiment of further details of the SHA-512 algorithm is now described.

SHA-512

SHA-512 may be used to hash a message, M, having a length of $\alpha$ bits, where $0 \leq \alpha < 2^{128}$. The algorithm uses 1) a message schedule of eighty 64-bit words, 2) eight working variables of 64 bits each, and 3) a hash value of eight 64-bit words. The final result of SHA-512 is a 512-bit message digest.

The words of the message schedule are labeled $W_0$, $W_1, \ldots, W_{79}$. The eight working variables are labeled a, b, c, d, e, f g, and h. The words of the hash value are labeled $H_0^{(i)}, H_1^{(i)}, \ldots, H_7^{(i)}$, which will hold the initial hash value, $H^{(o)}$, replaced by each successive intermediate hash value (after each message block is processed), $H^{(i)}$, and ending with the final hash value, $H^{(N)}$. SHA-512 also uses two temporary words, $T_1$ and $T_2$.

The SHA-512 algorithm may use one or more of the following parameters:
  a, b, c, ..., h Working variables that are the w-bit words used in the computation of the hash values, $H^{(i)}$.
  $H^{(i)}$ The $i^{th}$ hash value. $H^{(0)}$ is the initial hash value; $H^{(N)}$ is the final hash value and is used to determine the message digest.
  $H_j^{(i)}$ The $j^{th}$ word of the $i^{th}$ hash value, where $H_0^{(i)}$ is the left-most word of hash value i.
  $K_t$ Constant value to be used for the iteration t of the hash computation.
    SHA-512 uses a sequence of eighty constant 64-bit words, $K_0^{(512)}, K_1^{(512)}, \ldots, K_{79}^{(512)}$. These words represent the first sixty-four bits of the fractional parts of the cube roots of the first eighty prime numbers. In hex, these constant words are (from left to right)

```
428a2f98d728ae22 7137449123ef65cd b5c0fbcfec4d3b2f
e9b5dba58189dbbc 3956c25bf348b538 59f111f1b605d019
923f82a4af194f9b ab1c5ed5da6d8118 d807aa98a3030242
12835b0145706fbe 243185be4ee4b28c 550c7dc3d5ffb4e2
72be5d74f27b896f 80deb1fe3b1696b1 9bdc06a725c71235
c19bf174cf692694 e49b69c19ef14ad2 efbe4786384f25e3
0fc19dc68b8cd5b5 240ca1cc77ac9c65 2de92c6f592b0275
4a7484aa6ea6e483 5cb0a9dcbd41fbd4 76f988da831153b5
983e5152ee66dfab a831c66d2db43210 b00327c898fb213f
bf597fc7beef0ee4 c6e00bf33da88fc2 d5a79147930aa725
```

-continued

```
06ca6351e003826f 142929670a0e6e70 27b70a8546d22ffc
2e1b21385c26c926 4d2c6dfc5ac42aed 53380d139d95b3df
650a73548baf63de 766a0abb3c77b2a8 81c2c92e47edaee6
92722c851482353b a2bfe8a14cf10364 a81a664bbc423001
c24b8b70d0f89791 c76c51a30654be30 d192e819d6ef5218
d69906245565a910 f40e35855771202a 106aa07032bbd1b8
19a4c116b8d2d0c8 1e376c085141ab53 2748774cdf8eeb99
34b0bcb5e19b48a8 391c0cb3c5c95a63 4ed8aa4ae3418acb
5b9cca4f7763e373 682e6ff3d6b2b8a3 748f82ee5defb2fc
78a5636f43172f60 84c87814a1f0ab72 8cc702081a6439ec
90befffa23631e28 a4506cebde82bde9 bef9a3f7b2c67915
c67178f2e372532b ca273eceea26619c d186b8c721c0c207
eada7dd6cde0eb1e f57d4f7fee6ed178 06f067aa72176fba
0a637dc5a2c898a6 113f9804bef90dae 1b710b35131c471b
28db77f523047d84 32caab7b40c72493 3c9ebe0a15c9bebc
431d67c49c100d4c 4cc5d4becb3e42b6 597f299cfc657e2a
5fcb6fab3ad6faec 6c44198c4a475817
``` k Number of zeros appended to a message during the padding step.
$\alpha$ Length of the message, M, in bits.
m Number of bits in a message block, $M^{(i)}$. For SHA-512, each message block has 1024 bits, which are represented as a sequence of sixteen 64-bit words.
M Message to be hashed.
$M^{(i)}$ Message block i, with a size of m bits.
$M_j^{(i)}$ The $j^{th}$ word of the $i^{th}$ message block, where $M_0^{(i)}$ is the leftmost word of message block i.
n Number of bits to be rotated or shifted when a word is operated upon.
N Number of blocks in the padded message.
T Temporary w-bit word used in the hash computation.
w Number of bits in a word.
$W_t$ The $t^{th}$ w-bit word of the message schedule.

Further, one or more of the following symbols is used in the secure hash algorithm specification; each operates on w-bit words:
  $\wedge$ A Bitwise AND operation.
  $\vee$ Bitwise OR ("inclusive-OR") operation.
  $\oplus$ Bitwise XOR ("exclusive-OR") operation.
  — Bitwise complement operation.
  + Addition modulo $2^w$.
  << Left-shift operation, where x<<n is obtained by discarding the leftmost n bits of the word x and then padding the result with n zeros on the right.
  >> Right-shift operation, where x>>n is obtained by discarding the rightmost n bits of the word x and then padding the result with n zeros on the left.

Yet further, one or more of the following operations is used in the secure hash algorithm specification:
  $ROTL^n(x)$ The rotate left (circular left shift) operation, where x is a w-bit word and n is an integer with $0 \leq n < w$, is defined by $ROTL^n(x)=(x<<n) \vee (x>>w-n)$.
  $ROTR^n(x)$ The rotate right (circular right shift) operation, where x is a w-bit word and n is an integer with $0 \leq n < w$, is defined by $ROTR^n(x)=(x>>n) \vee (x<<w-n)$.
  $SHR^n(x)$ The right shift operation, where x is a w-bit word and n is an integer with $0 \leq n < w$, is defined by $SHR^n(x)=x>>n$ Moreover, the following operations are applied to w-bit words in the 512-bit secure hash algorithm. SHA-512 operates on 64-bit words (w=64).
  1. Bitwise logical word operations: $\wedge$, $\vee$, $\oplus$, and —.
  2. Additional modulo $2^w$.
    The operation x+y is defined as follows. The words x and y represent integer X and Y, where $0 \leq X < 2^w$ and $0 \leq Y < 2^w$. For positive integers U mod V, let U and V be the remainder upon dividing U by V. Compute $$Z = (X+Y) \mod 2^w.$$

Then $0 \leq Z < 2^w$. Convert the integer to Z to a word, z, and define z=x+y.

3. The right shift operation $SHR^n(x)$, where x is a w-bit word and n is an integer with $0 \leq n < w$, is defined by $$SHR^n(x) = x >> n.$$

4. The rotate right (circular right shift) operation $ROTR^n(x)$, where x is a w-bit word and n is an integer with $0 \leq n < w$, is defined by $$ROTR^n(x) = (x >> n) \vee (x << w-n).$$

Thus, $ROTR^n(x)$ is equivalent to a circular shift (rotation) of x by n positions to the right.

5. Note the following equivalence relationships, where w is fixed in each relationship:

$$ROTL^n(x) \approx ROTR^{w-n}(x)$$

$$ROTR^n(x) \approx ROTL^{w-n}(x)$$

Additionally, SHA-512 uses one or more of six logical functions, where each function operates on 64-bit words, which are represented as x, y, and z. The result of each function is a new 64-bit word.

$$Ch(x,y,z) = (x \wedge y) \oplus (\neg x \wedge z)$$

$$Maj(x,y,z) = (x \wedge y) \oplus (x \wedge z) \oplus (y \wedge z)$$

$$\Sigma_0^{(512)}(x) = ROTR^{28}(x) \oplus ROTR^{34}(x) \oplus ROTR^{39}(x)$$

$$\Sigma_1^{(512)}(x) = ROTR^{14}(x) \oplus ROTR^{18}(x) \oplus ROTR^{41}(x)$$

$$\sigma_0^{(512)}(x) = ROTR^1(x) \oplus ROTR^8(x) \oplus ROTR^7(x)$$

$$\sigma_0^{(512)}(x) = ROTR^{19}(x) \oplus ROTR^{61}(x) \oplus SHR^6(x)$$

SHA-512 is described in two stages: Preprocessing and Hash Computation.

SHA-512 Preprocessing

Preprocessing involves padding a message, parsing the padded message into m-bit blocks, and setting initialization values to be used in the hash computation. Initialization, padding and parsing are described below.

Initialization

Set the initial hash value, $H^{(0)}$, as described below.

For SHA-512, the initial hash value, $H^{(0)}$, shall include the following eight 64-bit words, in hex:

$H_0^{(0)}$=6a09e667f3bcc908
$H_1^{(0)}$=bb67ae8584caa73b
$H_2^{(0)}$=3c6ef372fe94f82b
$H_3^{(0)}$=a54ff53a5f1d36f1
$H_4^{(0)}$=510e527fade682d1
$H_5^{(0)}$=9b05688c2b3e6c1f
$H_6^{(0)}$=1f83d9abfb41bd6b
$H_7^{(0)}$=5be0cd19137e2179

The words are obtained by taking the first sixty-four bits of the fractional parts of the square roots of the first eight prime numbers.

Padding the Message

The purpose of this padding is to ensure that the padded message is a multiple of 512 or 1024 bits, depending on the algorithm. Padding can be inserted before hash computation begins on a message, or at any other time during the hash computation prior to processing the block(s) that will contain the padding.

Suppose the length of the message M, in bits, is $\propto$ bits. Append the bit "1" to the end of the message, followed by k zero bits, where k is the smallest non-negative solution to the equation $\propto + 1 + k \equiv 896 \mod 1024$. Then append the 128-bit block that is equal to the number $\propto$ expressed using a binary representation. For example, the (8-bit ASCII) message "abc" has length 8×3=24, so the message is padded with a one bit, then 896−(24+1)=871 zero bits, and then the message length, to become the 1024-bit padded message $$\underbrace{01100001}_{\text{"a"}} \underbrace{01100010}_{\text{"b"}} \underbrace{01100011}_{\text{"c"}} 1 \underbrace{\overset{871}{00 \ldots 00}}_{} \underbrace{\overset{128}{00 \ldots 011000}}_{l=24}$$

The length of the padded message is now a multiple of 1024 bits.

Parsing the Message

The message and its padding are parsed into N m-bit blocks.

For SHA-512, the message and its padding are parsed into N 1024-bit blocks, $M^{(1)}, \ldots, M^{(N)}$. Since the 1024 bits of the input block may be expressed as sixteen 64-bit words, the first 64 bits of message block i are denoted $M_0^{(i)}$, the next 64 bits are $M_1^{(i)}$, and so on up to $M_{15}^{(i)}$.

SHA-512 Hash Computation

The hash computation generates a message schedule from the padded message and uses that schedule along with functions, constants, and word operations to iteratively generate a series of hash values. The final hash value generated by the hash computation is used to determine the message digest.

The SHA-512 hash computation uses functions and constants, as described herein, and addition (+) is performed modulo $2^{64}$.

Each message block, $M^{(1)}, M^{(2)}, \ldots, M^{(N)}$, is processed in order, using the following steps:

For $i = 1$ to $N$:

{

1. Prepare the message schedule, $\{W_t\}$:

$$W_t = \begin{cases} M_t^{(i)} & 0 \leq t \leq 15 \\ \sigma_1^{\{512\}}(W_{t-2}) + W_{t-7} + \sigma_0^{\{512\}}(W_{t-15}) + W_{t-16} & 16 \leq t \leq 79 \end{cases}$$

2. Initialize the eight working variables, a, b, c, d, e, f, g, and h, with the $(i-1)^{st}$ hash value:

$a = H_0^{(i-1)}$ $b = H_1^{(i-1)}$ $c = H_2^{(i-1)}$ $d = H_3^{(i-1)}$ $e = H_4^{(i-1)}$ $f = H_5^{(i-1)}$ $g = H_6^{(i-1)}$ $h = H_7^{(i-1)}$

3. For t=0 to 79:

$$\left\{ \begin{aligned} & T_1 = h + \sum_{1}^{\{512\}}(e) + Ch(e, f, g) + K_t^{\{512\}} + W_t \\ & T_2 = \sum_{0}^{\{512\}}(a) + Maj(a, b, c) \\ & h = g \\ & g = f \\ & f = e \\ & e = d + T_1 \\ & d = c \\ & c = b \\ & b = a \\ & a = T_1 + T_2 \end{aligned} \right\}$$

4. Computer the $i^{th}$ intermediate hash value $H^{(i)}$:

$$\begin{aligned} H_0^{(i)} &= a + H_0^{(i-1)} \\ H_1^{(i)} &= b + H_1^{(i-1)} \\ H_2^{(i)} &= c + H_2^{(i-1)} \\ H_3^{(i)} &= d + H_3^{(i-1)} \\ H_4^{(i)} &= e + H_4^{(i-1)} \\ H_5^{(i)} &= f + H_5^{(i-1)} \\ H_6^{(i)} &= g + H_6^{(i-1)} \\ H_7^{(i)} &= h + H_7^{(i-1)} \end{aligned}$$
}

After repeating steps one through four a total of N times (i.e., after processing $M^{(N)}$), the resulting 512-bit message digest of the message, M, is $$H_0^{(N)} \| H_1^{(N)} \| H_2^{(N)} \| H_3^{(N)} \| H_4^{(N)} \| H_5^{(N)} \| H_6^{(N)} \| H_7^{(N)}$$

where ∪ is concatenation.

Described above is one example of a CPU instruction to initially seed or reseed a pseudorandom number generator and/or to perform a generate operation to produce pseudo-random numbers. This instruction provides a high-performance means of generating pseudorandom numbers, meets the NIST standards, and is extendable to alternate generation techniques. The right-to-left processing of the instruction (e.g., in the generate operation) offers certain performance advantages since, for instance, certain information need not be saved.

In one example, the instruction is extendable by specifying additional function codes, each of which corresponds to a different algorithm used to perform the initiation, reseeding and/or generation. The different algorithms may include other algorithms to meet NIST standards. Examples of other algorithms include HMAC_DRBG (Hash-based Message Authentication Code_DRBG), CTR_DRBG (Counter-DRBG), and DUAL_EC_DRBG (Dual_Elliptic Curve_DRBG). Further, the function codes may be used to identify different hash or key lengths, such as 512, 256, or others. Thus, in one example, the function code includes an indication of an algorithm and an indication of hash or key length, which provides many possibilities aside from the SHA-512 technique described herein. Further, the function codes can specify other types of functions. Many possibilities exist.

Herein, memory, main memory, storage and main storage are used interchangeably, unless otherwise noted explicitly or by context.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 10:
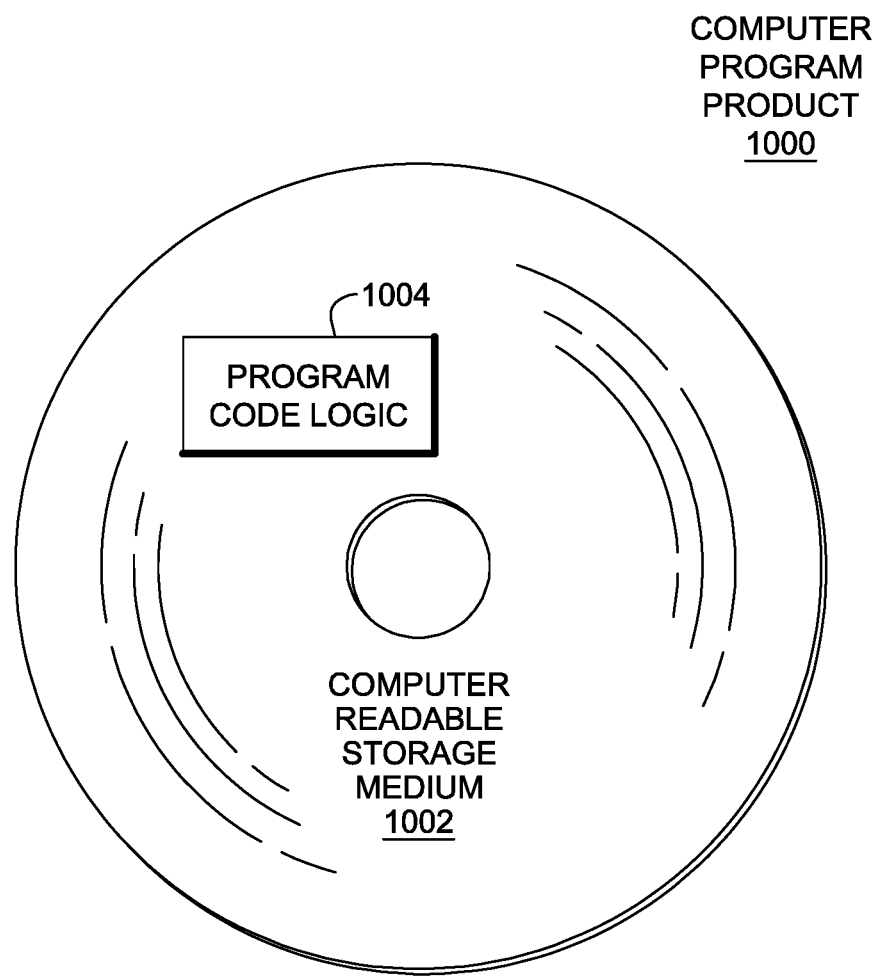
FIG. 10 depicts one embodiment of a computer program product incorporating one or more aspects.

Referring now to FIG. 10, in one example, a computer program product 1000 includes, for instance, one or more non-transitory computer readable storage media 1002 to store computer readable program code means or logic 1004 thereon to provide and facilitate one or more aspects.

Program code embodied on a computer readable medium may be transmitted using an appropriate medium, including but not limited to, wireless, wireline, optical fiber cable, RF, etc., or any suitable combination of the foregoing.

Computer program code for carrying out operations for aspects may be written in any combination of one or more programming languages, including an object oriented programming language, such as JAVA, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects. As one example, the deploying of an application comprises providing computer infrastructure operable to perform one or more aspects.

As a further aspect, a computing infrastructure may be deployed comprising integrating computer readable code into a computing system, in which the code in combination with the computing system is capable of performing one or more aspects.

As yet a further aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

Although various embodiments are described above, these are only examples. For example, computing environments of other architectures can incorporate and use one or more aspects. Further, changes to the instructions may be made without departing from the one or more aspects. Moreover, other registers may be used. Additionally, in other embodiments (e.g., for other techniques), other values may be used in the concatenations or other computations. Other variations are also possible.

Further, other types of computing environments can benefit from one or more aspects. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 11:
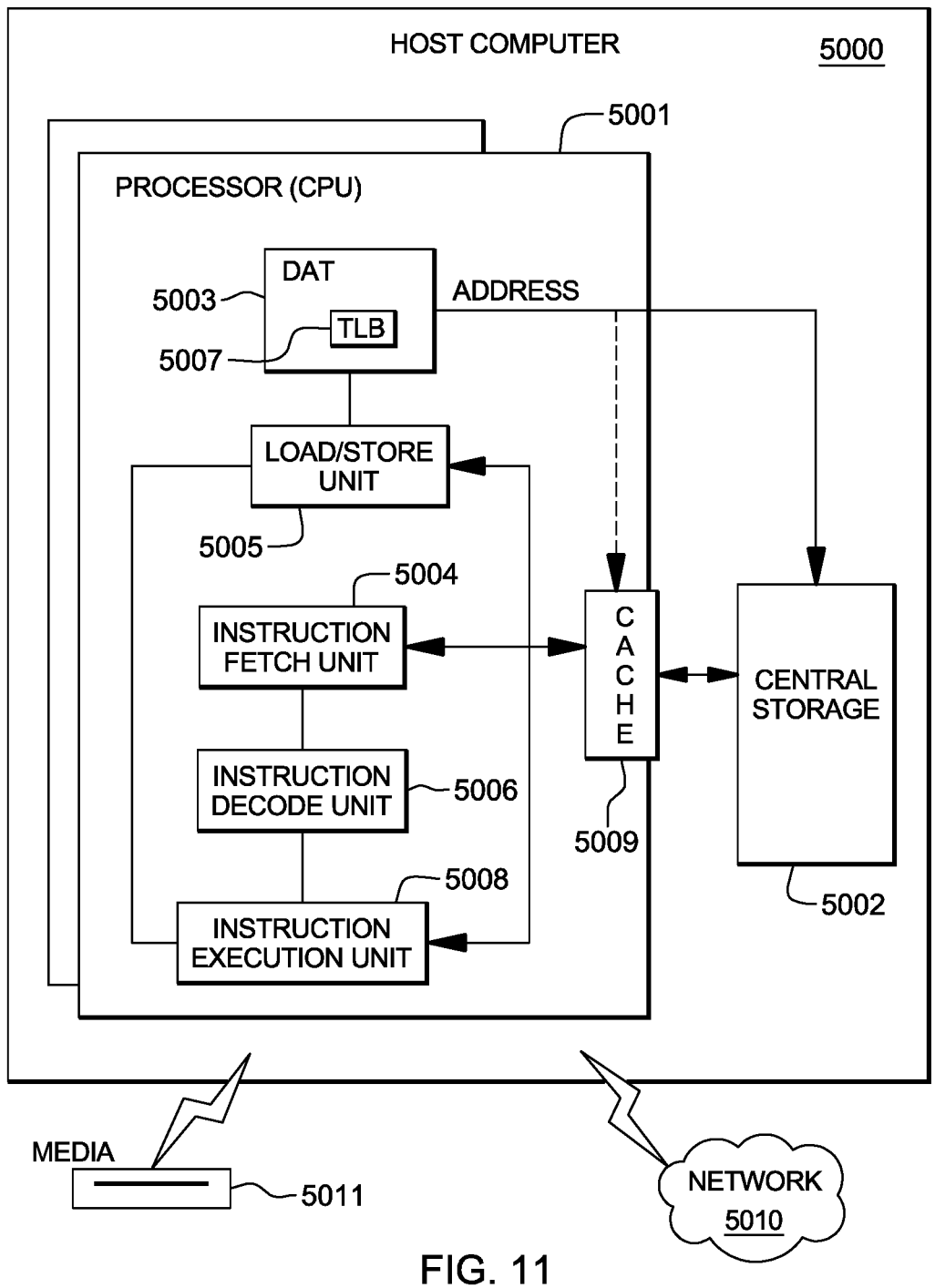
FIG. 11 depicts one embodiment of a host computer system.

Referring to FIG. 11, representative components of a Host Computer system 5000 to implement one or more aspects are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture, bits are numbered in a left-to-right sequence. In the z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with one or more aspects). Referring to FIG. 11, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 12:
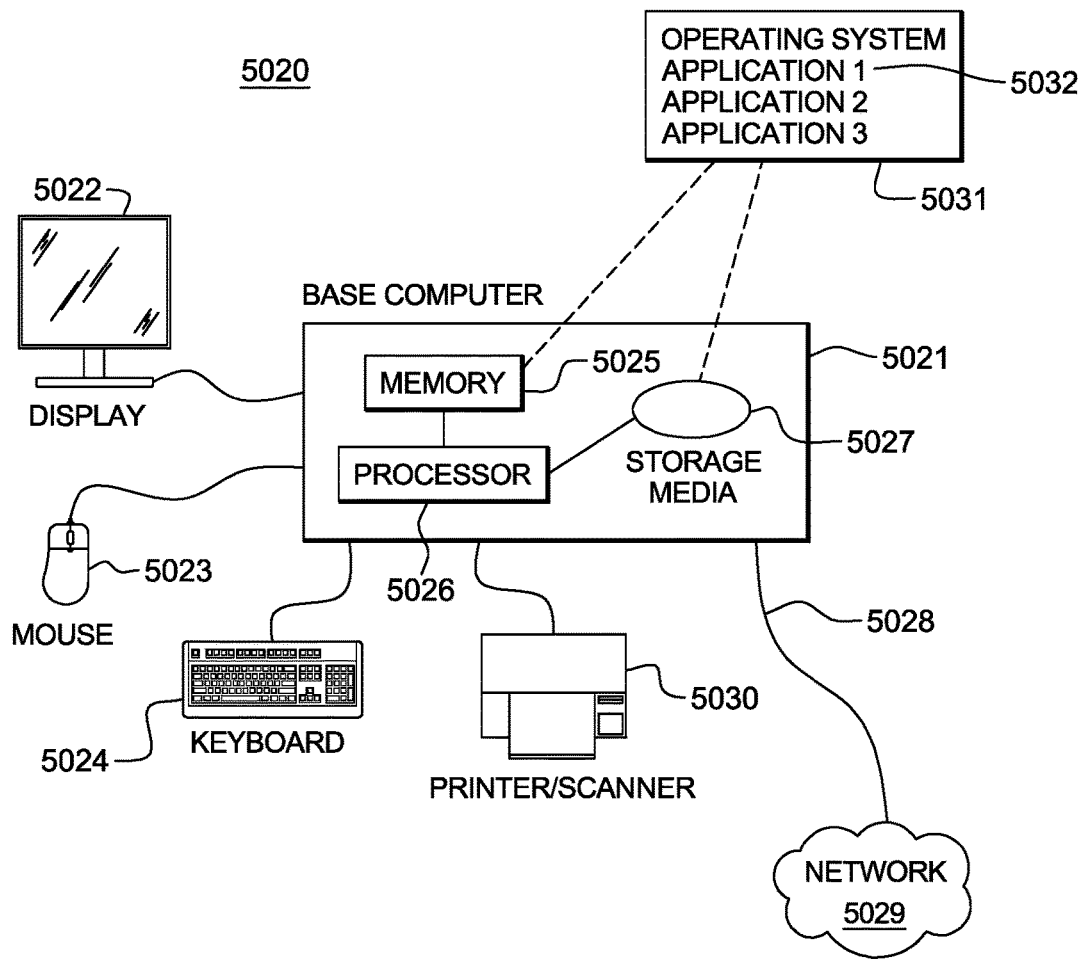
FIG. 12 depicts a further example of a computer system.

FIG. 12 illustrates a representative workstation or server hardware system in which one or more aspects may be practiced. The system 5020 of FIG. 12 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 13:
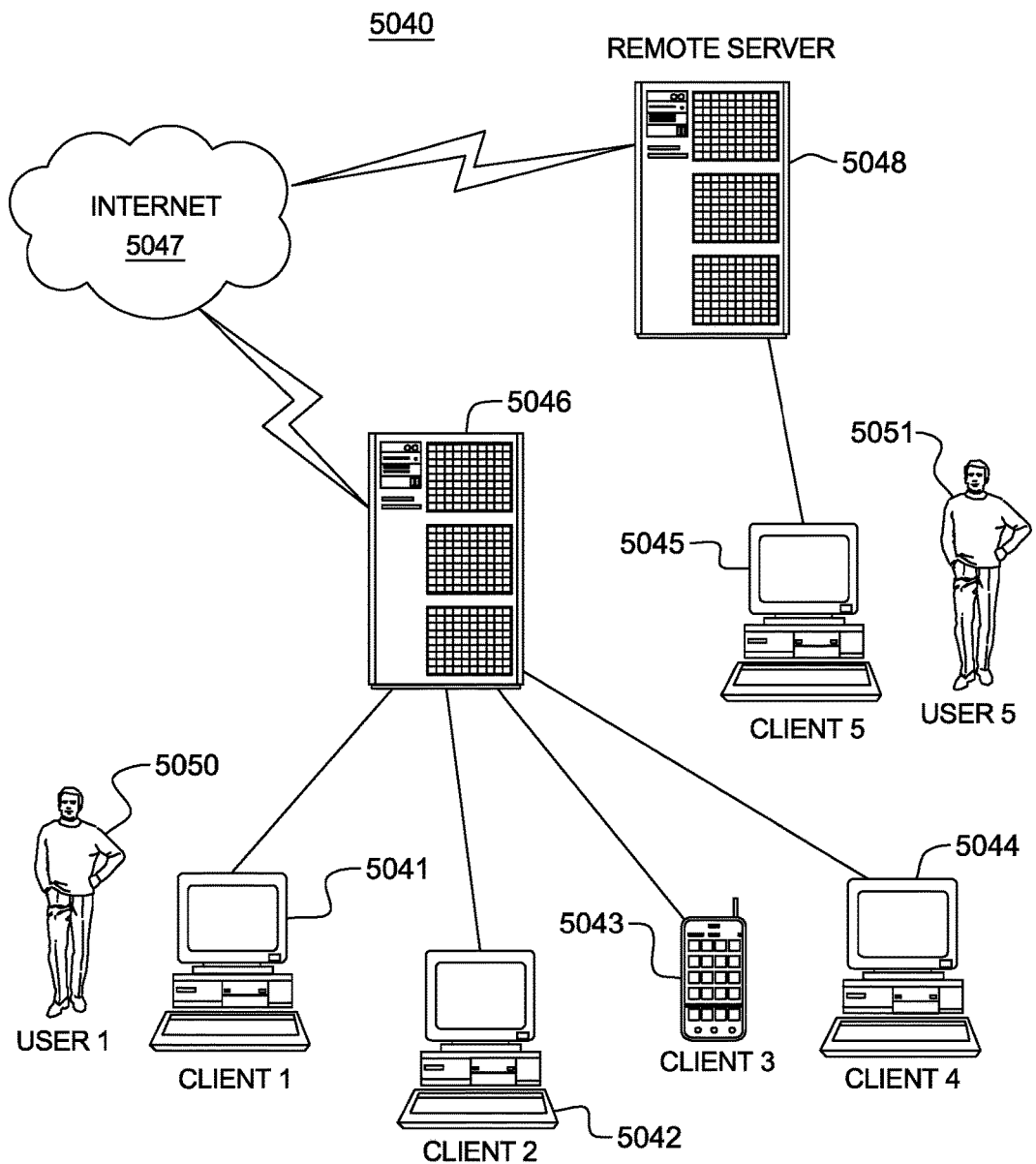
FIG. 13 depicts another example of a computer system comprising a computer network.

FIG. 13 illustrates a data processing network 5040 in which one or more aspects may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 13, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z server available from International Business Machines Corporation.

Referring concurrently to FIG. 12 and FIG. 13, software programming code which may embody one or more aspects of the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 14:
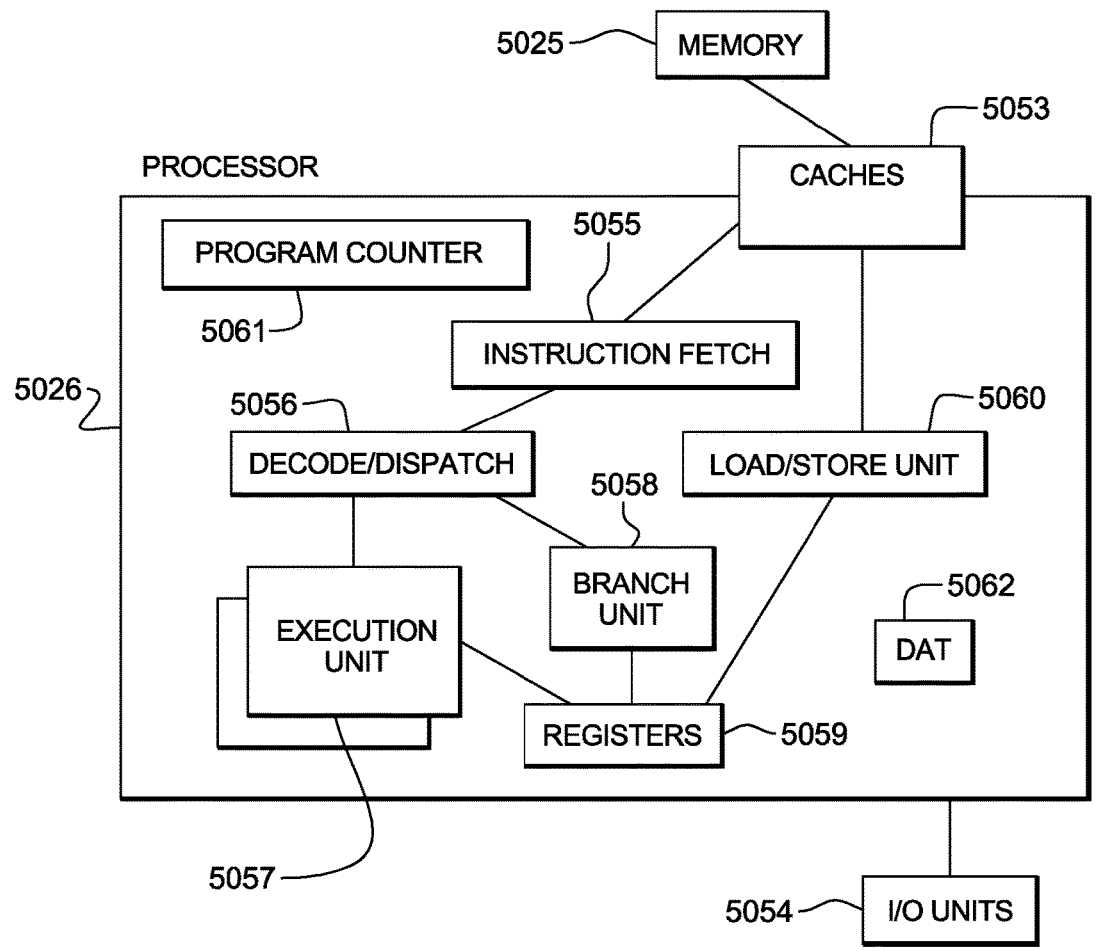
FIG. 14 depicts one embodiment of various elements of a computer system.

Referring to FIG. 14, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 15A:
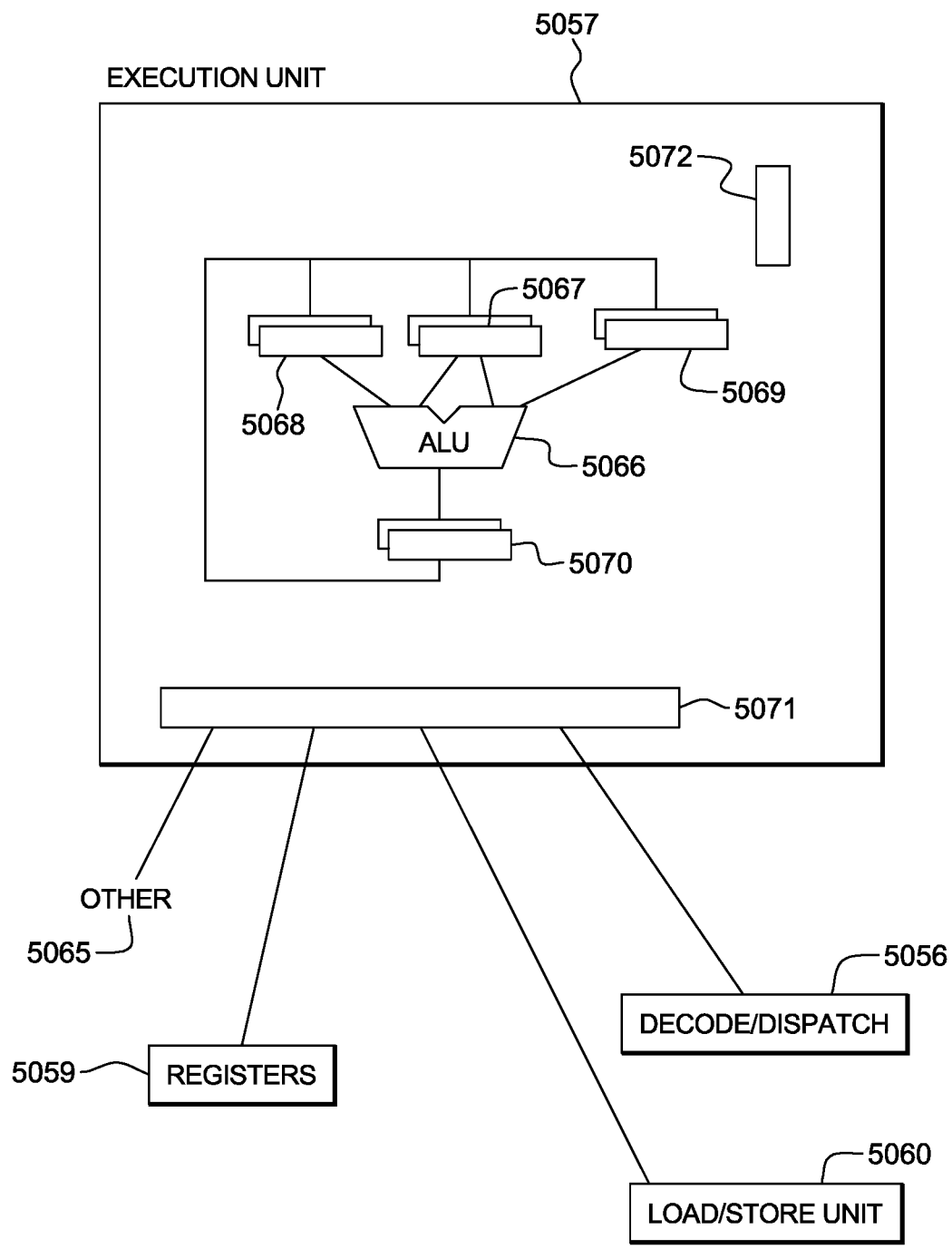
FIG. 15A depicts one embodiment of the execution unit of the computer system of FIG. 14.

A processor 5026 typically has one or more units 5057, 5058, 5060 for executing the function of the instruction. Referring to FIG. 15A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 15B:
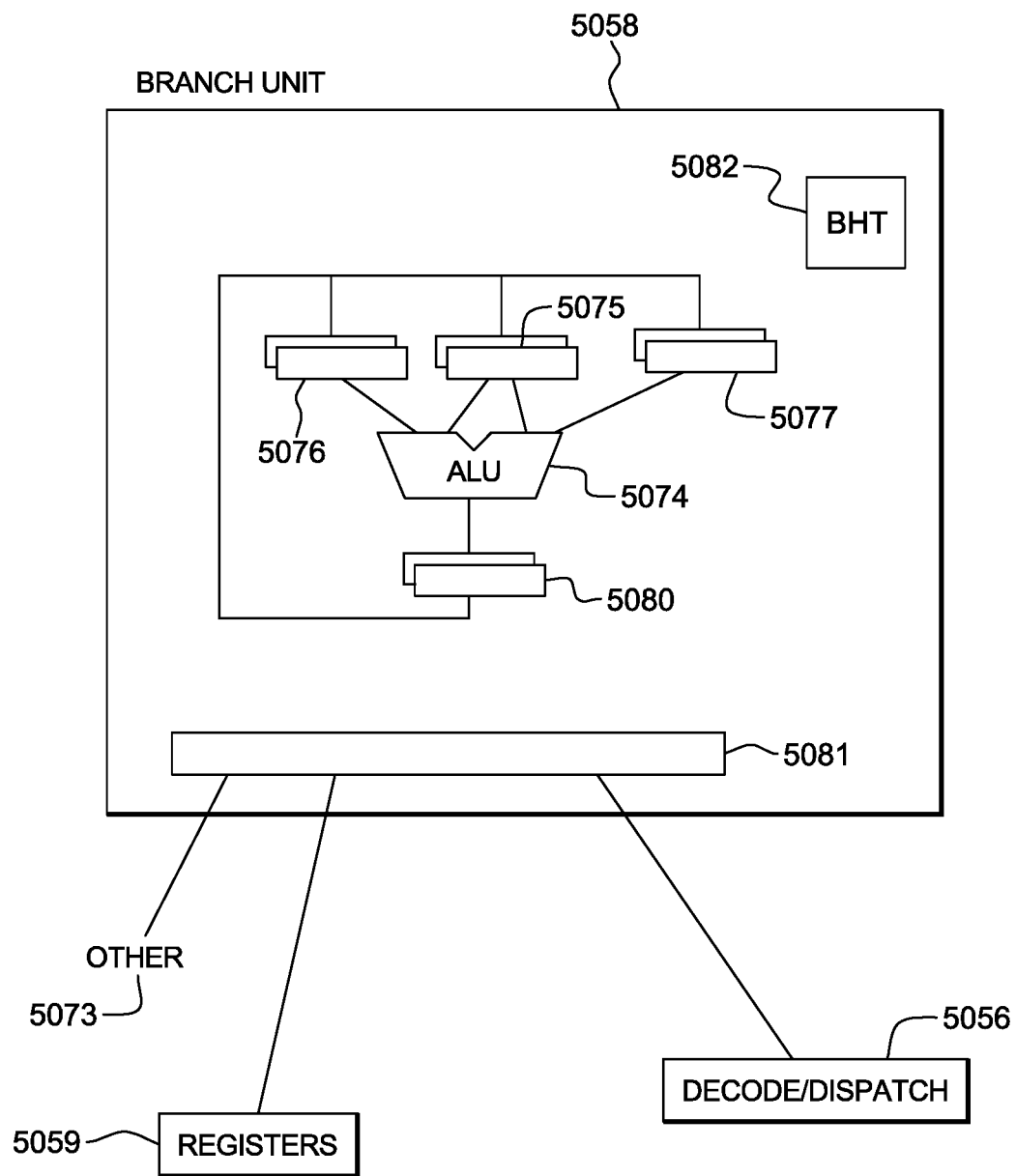
FIG. 15B depicts one embodiment of the branch unit of the computer system of FIG. 14.

Referring to FIG. 15B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example. Location herein typically implies a location in main memory (main storage) unless otherwise indicated.

Figure 15C:
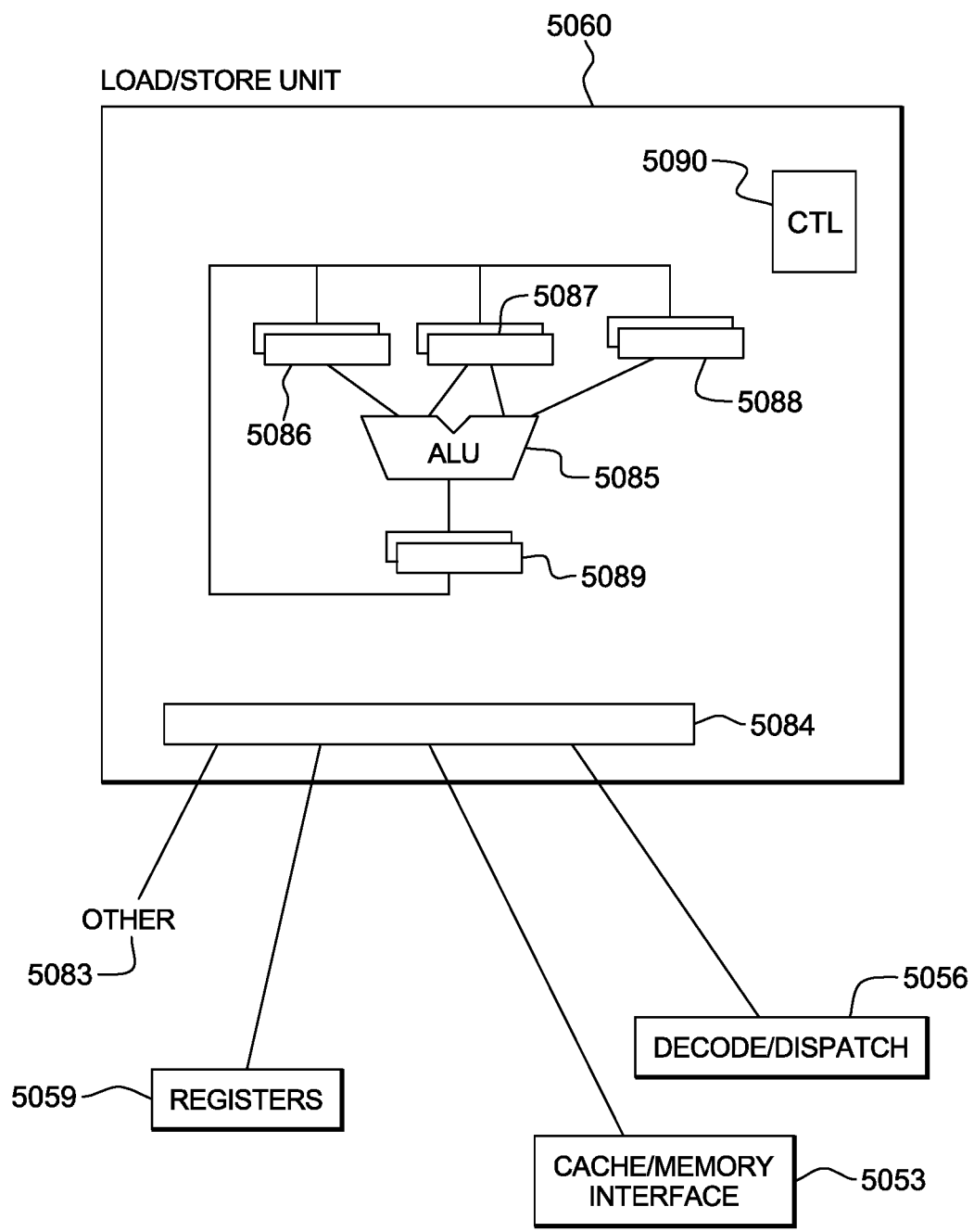
FIG. 15C depicts one embodiment of the load/store unit of the computer system of FIG. 14.

Referring to FIG. 15C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 14) provide the processor with means for attaching to peripheral devices including tape, disc, printers, displays, and networks for example. I/O units are often presented to the computer program by software drivers. In mainframes, such as the System z from IBM®, channel adapters and open system adapters are I/O units of the mainframe that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD®, and others. Besides execution on that hardware under a z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of one or more embodiments. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 16:
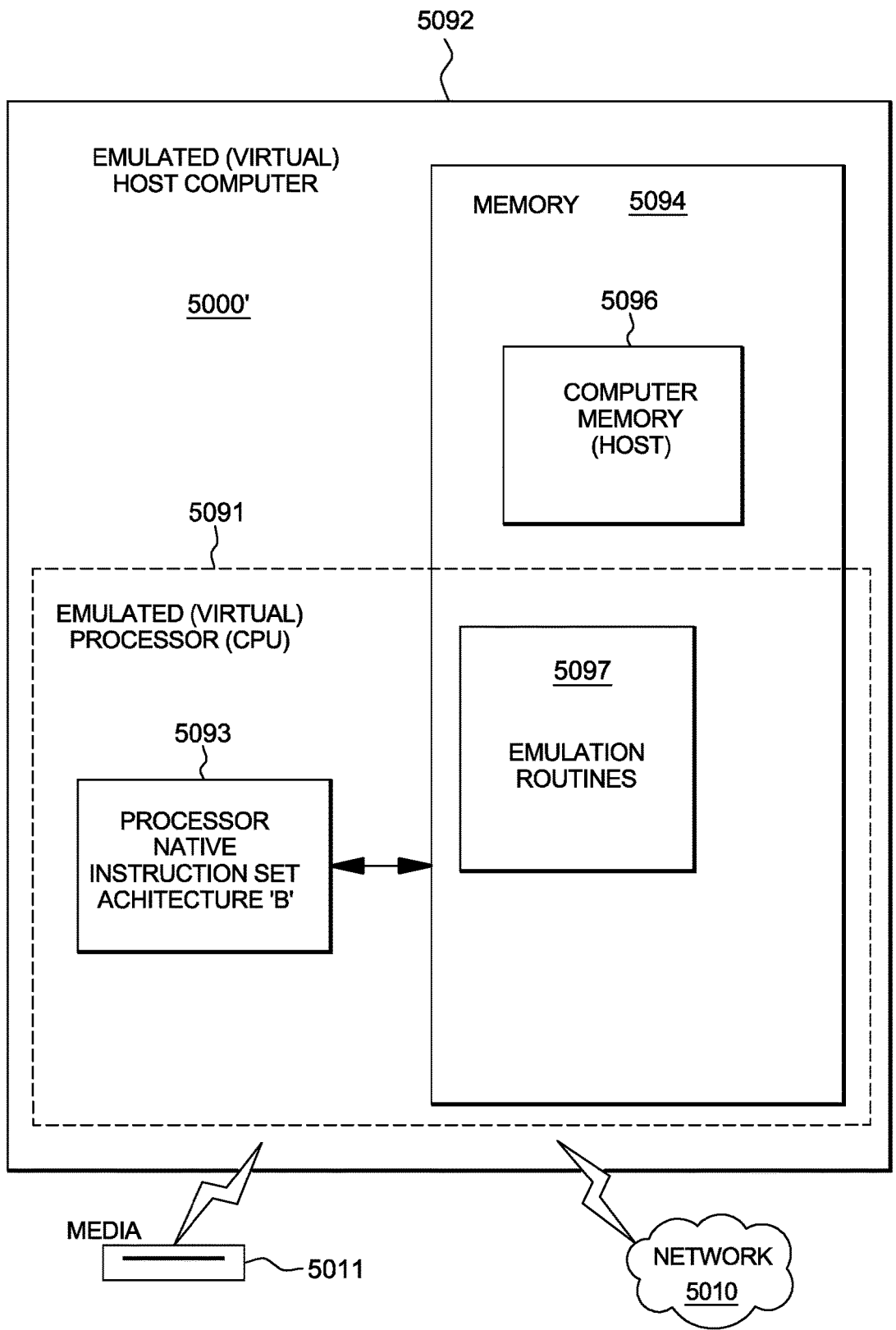
FIG. 16 depicts one embodiment of an emulated host computer system.

In FIG. 16, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects has been presented for purposes of illustration and description, but is not intended to be exhaustive or limited to the invention in the form disclosed. Many modifications and variations will be apparent to those of ordinary skill in the art without departing from the scope and spirit of one or more aspects. The embodiment was chosen and described in order to best explain the principles of the one or more aspects and the practical application, and to enable others of ordinary skill in the art to understand the one or more aspects for various embodiments with various modifications as are suited to the particular use contemplated.

What is claimed is:

1. A computer program product for executing a machine instruction, the computer program product comprising:
a non-transitory computer readable storage medium readable by a processing circuit and storing instructions for execution by the processing circuit for performing a method comprising:
obtaining, by a processor, a machine instruction for execution, the machine instruction being defined for computer execution according to a computer architecture, the machine instruction having associated therewith:
an opcode field to provide an opcode, the opcode to identify a perform pseudorandom number operation; and
a register field to be used to identify a register, the register to specify a location in memory of an operand to be used by the machine instruction; and
another register field to be used to identify another register, the another register to specify a location in memory of another operand to be used by the machine instruction;
executing the machine instruction, the executing comprising:
obtaining a modifier indicator from a register associated with the machine instruction;
based on the modifier indicator having a first value, performing a deterministic pseudorandom number seed operation, the deterministic pseudorandom number seed operation comprising:
obtaining seed material based on information included in the operand;
using a selected hash technique and the seed material to provide one or more seed values;
storing the one or more seed values in a parameter block associated with the machine instruction; and
based on the modifier indicator having a second value, performing a deterministic pseudorandom number generate operation, the deterministic pseudorandom number generate operation comprising:
for each block of memory of one or more blocks of memory of the another operand, generating a hash value using the selected hash technique and at least one seed value of the one or more seed values in the parameter block, and storing at least a portion of the generated hash value in a corresponding block of memory of the other operand, the generated hash value being at least a portion of a pseudorandom number.

2. The computer program product of claim 1, wherein the machine instruction comprises a register field to be used to identify a register, the register to specify a location in memory of the operand, and another register field to be used to identify another register, the other register to specify another location in memory of the other operand.

3. The computer program product of claim 1, wherein the executing further comprises obtaining a function code to specify a function to be performed, and based on the function code being a particular value, obtaining the modifier indicator.

4. The computer program product of claim 1, wherein the parameter block is configured to include a reseed counter to indicate a number of times the machine instruction has completed with a specific condition code since the parameter block was last instantiated or reseeded; a stream bytes field to track a number of bytes stored based on a generate operation; a value to indicate an internal state of a random number generator represented by the parameter block; and a constant value to be initialized by execution of a seed operation.

5. The computer program product of claim 1, wherein the deterministic pseudorandom number seed operation further comprises forming the seed material, the forming being based on a value of a reseed counter of the parameter block.

6. The computer program product of claim 5, wherein based on the value of the reseed counter having one value, the forming comprises using the information of the operand to form the seed material, the information comprising at least one of entropy input, nonce and a personalized string.

7. The computer program product of claim 5, wherein based on the value of the reseed counter having another value, the forming comprises combining a selected value, contents of a value field of the parameter block, and the information of the operand to form the seed material, the information comprising at least one of entropy input and additional input.

8. The computer program product of claim 1, wherein the using the selected hash technique to provide one or more seed values comprises using the selected hash technique to provide a $V_{new}$ seed value, the using to provide the $V_{new}$ seed value comprising:
providing a first counter, a selected value, the seed material and padding to the selected hash technique;
invoking the selected hash technique using the first counter, the selected value, the seed material and the padding to obtain a first hashed result;
providing a second counter, the selected value, the seed material and the padding to the selected hash technique;
invoking the selected hash technique using the second counter, the selected value, the seed material and the padding to obtain a second hashed result;
combining the first hashed result and the second hashed result to obtain a combined result; and
using a portion of the combined result to provide the $V_{new}$ seed value.

9. The computer program product of claim 8, wherein the using the selected hash technique to provide the one or more seed values further comprises using the selected hash technique to provide a $C_{new}$ seed value, the using to provide the $C_{new}$ seed value comprising:
invoking the selected hash technique using the first counter, the selected value, a defined value, the $V_{new}$ seed value, and the padding to obtain a third hashed result;
invoking the selected hash technique using the second counter, the selected value, the defined value, the $V_{new}$ seed value and the padding to obtain a fourth hashed result;
combining the third hashed result and the fourth hashed result to obtain another combined result; and
using a portion of the other combined result to provide the $C_{new}$ seed value.

10. The computer program product of claim 9, wherein the combining the first hashed value and the second hashed value comprises concatenating the first hashed value and the second hashed value to provide the combined result, and the using the portion of the combined result comprises using a leftmost number of bytes of the combined result as $V_{new}$; and wherein the combining the third hashed value and the fourth hashed value comprises concatenating the third hashed value and the fourth hashed value to provide the other combined result, and the using the portion of the other combined result comprises using a leftmost number of bytes of the other combined result as $C_{new}$.

11. The computer program product of claim 1, wherein the selected hash technique comprises a 512 bit secure hash technique.

12. A computer system for executing a machine instruction, the computer system comprising:
   a memory; and
   a processor in communication with the memory, wherein the computer system is configured to perform a method, said method comprising:
      obtaining a machine instruction for execution, the machine instruction being defined for computer execution according to a computer architecture, the machine instruction having associated therewith:
         an opcode field to provide an opcode, the opcode to identify a perform pseudorandom number operation; and
         a register field to be used to identify a register, the register to specify a location in memory of an operand to be used by the machine instruction; and
         another register field to be used to identify another register, the another register to specify a location in memory of another operand to be used by the machine instruction;
      executing the machine instruction, the executing comprising:
         obtaining a modifier indicator from a register associated with the machine instruction;
         based on the modifier indicator having a first value, performing a deterministic pseudorandom number seed operation, the deterministic pseudorandom number seed operation comprising:
            obtaining seed material based on information included in the operand;
            using a selected hash technique and the seed material to provide one or more seed values;
            storing the one or more seed values in a parameter block associated with the machine instruction; and
         based on the modifier indicator having a second value, performing a deterministic pseudorandom number generate operation, the deterministic pseudorandom number generate operation comprising:
            for each block of memory of one or more blocks of memory of the another operand, generating a hash value using the selected hash technique and at least one seed value of the one or more seed values in the parameter block, and storing at least a portion of the generated hash value in a corresponding block of memory of the other operand, the generated hash value being at least a portion of a pseudorandom number.

13. The computer system of claim 12, wherein the using the selected hash technique to provide one or more seed values comprises using the selected hash technique to provide a $V_{new}$ seed value, the using to provide the $V_{new}$ seed value comprising:
   providing a first counter, a selected value, the seed material and padding to the selected hash technique;
   invoking the selected hash technique using the first counter, the selected value, the seed material and the padding to obtain a first hashed result;
   providing a second counter, the selected value, the seed material and the padding to the selected hash technique;
   invoking the selected hash technique using the second counter, the selected value, the seed material and the padding to obtain a second hashed result;
   combining the first hashed result and the second hashed result to obtain a combined result; and
   using a portion of the combined result to provide the $V_{new}$ seed value.

14. The computer system of claim 12, wherein the selected hash technique comprises a 512 bit secure hash technique.

15. A computer-implemented method of executing a machine instruction, the computer-implemented method comprising:
   obtaining, by a processor, a machine instruction for execution, the machine instruction being defined for computer execution according to a computer architecture, the machine instruction having associated therewith:
      an opcode field to provide an opcode, the opcode to identify a perform pseudorandom number operation; and
      a register field to be used to identify a register, the register to specify a location in memory of an operand to be used by the machine instruction; and
   executing the machine instruction, the executing comprising:
      another register field to be used to identify another register, the another register to specify a location in memory of another operand to be used by the machine instruction;
      obtaining a modifier indicator from a register associated with the machine instruction;
      based on the modifier indicator having a first value, performing a deterministic pseudorandom number seed operation, the deterministic pseudorandom number seed operation comprising:
         obtaining seed material based on information included in the operand;
         using a selected hash technique and the seed material to provide one or more seed values;
         storing the one or more seed values in a parameter block associated with the machine instruction; and
      based on the modifier indicator having a second value, performing a deterministic pseudorandom number generate operation, the deterministic pseudorandom number generate operation comprising:
         for each block of memory of one or more blocks of memory of the another operand, generating a hash value using the selected hash technique and at least one seed value of the one or more seed values in the parameter block, and storing at least a portion of the generated hash value in a corresponding block of memory of the other operand, the generated hash value being at least a portion of a pseudorandom number.

16. The computer-implemented method of claim 15, wherein the using the selected hash technique to provide one or more seed values comprises using the selected hash technique to provide a $V_{new}$ seed value, the using to provide the $V_{new}$ seed value comprising:
   providing a first counter, a selected value, the seed material and padding to the selected hash technique;
   invoking the selected hash technique using the first counter, the selected value, the seed material and the padding to obtain a first hashed result;
   providing a second counter, the selected value, the seed material and the padding to the selected hash technique;

invoking the selected hash technique using the second counter, the selected value, the seed material and the padding to obtain a second hashed result;

combining the first hashed result and the second hashed result to obtain a combined result; and using a portion of the combined result to provide the $V_{new}$ seed value.

17. The computer-implemented method of claim 15, wherein the selected hash technique comprises a 512 bit secure hash technique.

* * * * *